United States Patent
Adachi et al.

(10) Patent No.: US 10,571,314 B2
(45) Date of Patent: Feb. 25, 2020

(54) SIGNAL PROCESSING APPARATUS AND SIGNAL PROCESSING METHOD

(71) Applicant: Sharp Kabushiki Kaisha, Sakai, Osaka (JP)

(72) Inventors: Yoshihisa Adachi, Sakai (JP); Tetsuya Okumura, Sakai (JP); Tetsuya Hayashi, Sakai (JP); Shigemi Maeda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 421 days.

(21) Appl. No.: 15/515,618

(22) PCT Filed: Aug. 31, 2015

(86) PCT No.: PCT/JP2015/074708
§ 371 (c)(1),
(2) Date: Mar. 30, 2017

(87) PCT Pub. No.: WO2016/052049
PCT Pub. Date: Apr. 7, 2016

(65) Prior Publication Data
US 2018/0328767 A1 Nov. 15, 2018

(30) Foreign Application Priority Data
Oct. 2, 2014 (JP) .................................. 2014-204326

(51) Int. Cl.
*G01D 21/02* (2006.01)
*G01D 1/00* (2006.01)
(Continued)

(52) U.S. Cl.
CPC ............... *G01D 21/02* (2013.01); *G01D 1/00* (2013.01); *G01D 1/18* (2013.01); *G01D 9/02* (2013.01);
(Continued)

(58) Field of Classification Search
CPC .......... G01D 1/18; G01D 21/00; G01D 21/02; G01D 3/032; G01D 9/02; G01K 15/00; G01K 15/005
See application file for complete search history.

(56) References Cited

U.S. PATENT DOCUMENTS

| | | | |
|---|---|---|---|
| 6,408,227 B1 * | 6/2002 | Singhvi | C02F 1/008 |
| | | | 700/266 |
| 2010/0169050 A1 * | 7/2010 | Razzaghi | G01K 7/42 |
| | | | 702/189 |
| 2015/0168220 A1 * | 6/2015 | Nagahisa | G01J 5/10 |
| | | | 374/121 |

FOREIGN PATENT DOCUMENTS

JP  2005-242803 A  9/2005

\* cited by examiner

*Primary Examiner* — Kyle R Quigley
(74) *Attorney, Agent, or Firm* — Keating & Bennett, LLP

(57) ABSTRACT

Signal processing apparatus includes: an input interface configured to receive an output signal $V_{a(T)}$ from a sensor; a prediction circuit configured to generate, on the basis of a relationship different depending on each of a plurality of converged values $V_c$, a plurality of predicted values $V_{b\_T2}$ corresponding to a value of the output signal that would be obtained at a time T2 after a time T1, in a transition response period before a response time period Tr elapses where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at the time T1; and an estimation circuit configured to generate, on the basis of the value $V_{a\_T2}$ of the output signal obtained at the time T2 and the plurality of predicted values $V_{b\_T2}$, an estimated value Pe of a parameter representing the certain property of the object to be measured.

15 Claims, 11 Drawing Sheets

(51) Int. Cl.
  *G01K 7/42*   (2006.01)
  *G01D 1/18*   (2006.01)
  *G01D 9/02*   (2006.01)
  *G01D 3/028*   (2006.01)
  *G01D 3/032*   (2006.01)
(52) U.S. Cl.
  CPC ............... *G01K 7/42* (2013.01); *G01D 3/028* (2013.01); *G01D 3/032* (2013.01)

SIGNAL PROCESSING APPARATUS AND SIGNAL PROCESSING METHOD

TECHNICAL FIELD

The present invention relates to a signal processing apparatus, a signal processing method, and a computer program, and in particular, relates to a signal processing apparatus, a signal processing method, and a computer program with which it is possible to evaluate an estimated value on the basis of an output signal from a sensor.

BACKGROUND ART

Of various types of sensors using a semiconductor such as a gas sensor, a humidity sensor, and a temperature sensor, there are some sensors which require a relatively long time period from a start of measurement until a value of the output signal (for example, a voltage value) is converged. That is, when a certain property of an object to be measured is evaluated on the basis of an output signal from a sensor, it is not possible to evaluate the property until a value of the output signal is converged. For example, a semiconductor gas sensor for detecting a smell requires about 600 seconds, for example, from a start of measurement until the value of the output signal is converged.

Note that as used herein, "the value of the output signal is converged" means that a difference between a value of the output signal at a certain time after a sufficient time period elapses and a value of the output signal at a time before the certain time, is a value, during a prescribed time period, within a prescribed range, and the converged value of the output signal is referred to as "converged value". Further, a time period from a start of measurement until the value of the output signal is converged is referred to as "response time period", and a period until the response time period elapses is referred to as "transition response period".

In order to quickly evaluate a certain property of an object to be measured on the basis of the output signal from the sensor, the converged value corresponding to the property may be estimated on the basis of the value of the output signal in the transition response period. Various methods of estimating such a converged value are studied. For example, PTL 1 discloses a method of estimating what performance a machine having different performance depending on each driving operation environment demonstrates under an unknown operation environment, for example. According to the estimation method described in PTL 1, input operation environment data is categorized according to a categorization condition, the categorized data is supplied to a corresponding single model, and an estimated value is evaluated from the single model.

CITATION LIST

Patent Literature

PTL 1: Japanese Unexamined Patent Application Publication No. 2005-242803A

SUMMARY OF INVENTION

Technical Problem

According to the estimation method described in PTL 1, the input operation environment data is categorized according to a categorization condition, and then, a single model corresponding to the categorized data is selected. Therefore, the problem is that in order to reduce an estimation error, it is necessary that a model corresponding to each category is accurate, and it is also necessary to prepare a large number of categories and models corresponding to the large number of categories.

The present invention has been achieved to overcome the above problem, and provides a signal processing apparatus, a signal processing method, and a computer program with which it is possible to evaluate relatively easily and sufficiently accurately an estimated value on the basis of an output signal from a sensor.

Solution to Problem

A signal processing apparatus according to an embodiment of the present invention includes: an input interface configured to receive an output signal $V_{a(T)}$ from a sensor; a prediction circuit configured to generate, on the basis of a relationship, different depending on each of a plurality of converged values $V_c$ corresponding to the respectively different parameter values, a plurality of predicted values $V_{b\_T2}$ corresponding to a value of the output signal that would be obtained at a time T2 after the time T1, in a transition response period before a response time period Tr elapses, where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at a time T1; and an estimation circuit configured to generate, on the basis of a value $V_{a\_T2}$ of the output signal obtained at the time T2 and the plurality of predicted values $V_{b\_T2}$, an estimated value Pe of a parameter representing the certain property of the object to be measured.

In a certain embodiment, the signal processing apparatus further includes a first memory configured to store the value of the output signal $V_{a(T)}$. The prediction circuit acquires from the first memory, the value of the output signal $V_{a\_T1}$ obtained at the time T1 to generate the plurality of predicted values $V_{b\_T2}$, and the estimation circuit acquires, from the prediction circuit, the plurality of predicted values $V_{b\_T2}$.

In a certain embodiment, the signal processing apparatus further includes a second memory configured to store the plurality of predicted values $V_{b\_T2}$ and the respectively different values P of the parameter in an associated manner. The estimation circuit acquires the plurality of predicted values $V_{b\_T2}$ and the respectively different values P of the parameter from the second memory.

In a certain embodiment, the estimation circuit evaluates an error $V_{e\_T2}$ between the plurality of predicted values $V_{b\_T2}$ and the value $V_{a\_T2}$ of the output signal obtained at the time T2 to generate, on the basis of the error $V_{e\_T2}$, the estimated value Pe of the object to be measured.

In a certain embodiment, in accordance with a value $V_{a\_T3}$ of the output signal obtained at a time T3 after the time T1, the prediction circuit further generates, on the basis of a relationship, different depending on each of a plurality of converged values $V_c$ corresponding to the respectively different values of the parameter, a plurality of predicted values $V_{b\_T4}$ corresponding to a value of the output signal that would be obtained at a time T4 after the time T3. Here, the time T3 may be the same as or different from the time T2.

In a certain embodiment, in accordance with the value $V_{a\_T3}$ of the output signal obtained at the time T3 after the time T1, the prediction circuit further generates, on the basis of a relationship, different depending on each of a plurality of converged values $V_c$ corresponding to respectively different values of the parameter, a plurality of predicted values $V_{b\_T4}$ corresponding to a value of the output signal that would be obtained at a time T4 after the time T3. The estimation circuit evaluates the error $V_{e\_T2}$ between the plurality of predicted values $V_{b\_T2}$ and the value $V_{a\_T2}$ of the output signal obtained at the time T2, and an error $V_{e\_T4}$ between the plurality of predicted values $V_{b\_T4}$ and the value $V_{a\_T4}$ of the output signal obtained at the time T4 so as to generate, on the basis of the error $V_{e\_T2}$, the error $V_{e\_T4}$, or an accumulated value of the errors, the estimated value Pe of the object to be measured.

In a certain embodiment, the time T2 is later than the time T1 by a prescribed time period Tc, and the time T4 is later than the time T3 by the prescribed time period Tc.

In a certain embodiment, at each elapse of the prescribed time period Tc, in accordance with a value $V_{a\_Tk}$ of the output signal (k is an integer of 1 or greater) obtained at a certain time, the prediction circuit generates a plurality of predicted values $V_{b\_Tk+1}$ corresponding to a value of the output signal that would be obtained after the prescribed time period Tc from the certain time, and at each elapse of the prescribed time period Tc, in accordance with a value $V_{a\_Tm}$ of the output signal (m is an integer of 1 or greater) obtained at another time different from the certain time, generates a plurality of predicted values $V_{b\_Tm+1}$ corresponding to a value of the output signal that would be obtained after the prescribed time period Tc from the other time. The estimation circuit evaluates an error $V_{e\_Tk+1}$ between the plurality of predicted values $V_{b\_Tk+1}$ and the value $V_{a\_Tk+1}$ of the output signal and an error $V_{e\_Tm+1}$ between the plurality of predicted values $V_{b\_Tm+1}$ and the value $V_{a\_Tm+1}$ of the output signal so as to generate, on the basis of the error $V_{e\_Tk+1}$, the error $V_{e\_Tm+1}$, or an accumulated value of the errors, the estimated value Pe of the object to be measured. Here, the other time may be the same as or different from a time after the prescribed time period Tc from the certain time.

In a certain embodiment, at each elapse of the prescribed time period Tc, in accordance with a value $V_{a\_Tk}$ (k is an integer of 1 or greater) of an output signal at the each time, the prediction circuit generates a plurality of predicted values $V_{b\_Tk+n}$ corresponding to a value of the output signal that would be obtained after the prescribed time period n*Tc (n is an integer of 1 or greater) from that time. The estimation circuit evaluates an error $V_{e\_Tk+n}$ between the plurality of predicted values $V_{b\_Tk+n}$ and the value $V_{a\_Tk+n}$ of the output signal and an error $V_{e\_Tk+n+1}$ between the plurality of predicted values $V_{b\_Tk+n+1}$ and the value $V_{a\_Tk+n+1}$ of the output signal so as to generate on the basis of the error $V_{e\_Tk+n}$, the error $V_{e\_Tk+n+1}$, or an accumulated value of the errors, the estimated value Pe of the object to be measured.

In a certain embodiment, the estimation circuit generates, on the basis of an accumulated value of the errors over a previously determined period, the estimated value Pe of the object to be measured.

In a certain embodiment, the estimation circuit generates, on the basis of a minimum value of an absolute value of an accumulated value of the errors, the estimated value Pe of the object to be measured.

In a certain embodiment, the accumulated value of the errors is reset for each previously determined period.

In a certain embodiment, the prediction circuit includes a neural network.

In a certain embodiment, the signal processing apparatus further includes the sensor.

A signal processing method according to an embodiment of the present invention includes: receiving, from a sensor, an output signal $V_{a(T)}$; generating, in a transition response period before a response time period Tr elapses, where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at a time T1, on the basis of a relationship, different depending on each of a plurality of converged values $V_c$ corresponding to the respectively different values of the parameter, a plurality of predicted values $V_{b\_T2}$ corresponding to a value of the output signal that would be obtained at a time T2 after the time T1; and generating, on the basis of a value $V_{a\_T2}$ of the output signal obtained at the time T2 and the plurality of predicted values $V_{b\_T2}$, an estimated value Pe of the parameter representing the certain property of the object to be measured.

In a certain embodiment, the signal processing method may be executed by the signal processing apparatus according to any of the above.

A program according to an embodiment of the present invention causes a computer to execute: receiving, from a sensor, an output signal $V_{a(T)}$; generating, in a transition response period before a response time period Tr elapses, where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at a time T1, on the basis of a relationship, different depending on each of a plurality of converged values $V_c$ corresponding to the respectively different values of the parameter, a plurality of predicted values $V_{b\_T2}$ corresponding to a value of the output signal that would be obtained at a time T2 after the time T1; and generating, on the basis of a value $V_{a\_T2}$ of the output signal obtained at the time T2 and the plurality of predicted values $V_{b\_T2}$, an estimated value Pe of the parameter representing the certain property of the object to be measured.

In a certain embodiment, the program causes a computer to execute a signal processing method that may be executed by the signal processing apparatus according to any of the above. The computer may be a plurality of computers connected via a network.

A program according to an embodiment of the present invention causes a computer to function as an input interface unit configured to receive an output signal $V_{a(T)}$ from a sensor, a prediction unit configured to generate, on the basis of a relationship, different depending on each of a plurality of converged values $V_c$ corresponding to the respectively different values of the parameter, a plurality of predicted values $V_{b\_T2}$ corresponding to a value of the output signal that would be obtained at a time T2 after a time T1, in a transition response period before a response time period Tr elapses, where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at the time T1, and an estimation unit configured to generate, on the basis of a value $V_{a\_T2}$ of the output signal obtained at the time T2 and the plurality of predicted values $V_{b\_T2}$, an estimated value Pe of a parameter representing the certain property of the object to be measured. The input interface unit, the prediction unit, and the estimation unit respectively may correspond to the input interface, the prediction circuit, and the estimation circuit of the signal processing apparatus according to any of the above, for example. That is, the program according to an embodiment of the present invention causes a computer to function as the signal processing apparatus according to any of the above, for example. The program according to an embodiment of the present invention may be implemented in a memory of a computer, for example.

Advantageous Effects of Invention

According to an embodiment of the present invention, it is possible to provide a signal processing apparatus, a signal processing method, and a computer program with which it is possible to evaluate relatively easily and sufficiently accurately an estimated value on the basis of an output signal from a sensor.

DESCRIPTION OF EMBODIMENTS

Figure 1:
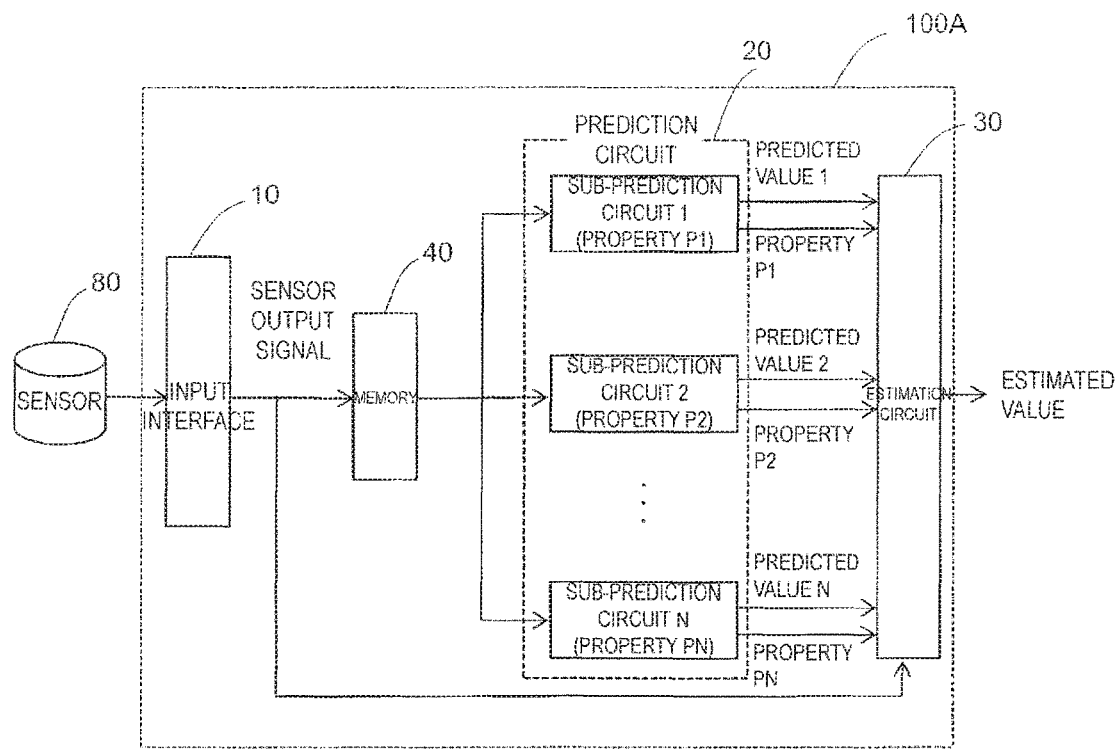
FIG. 1 is a diagram schematically illustrating a configuration of a signal processing apparatus 100A according to a first embodiment of the present invention.

With reference to drawings, a signal processing apparatus, a signal processing method, and a computer program will be described below.

A signal processing apparatus according to an embodiment of the present invention includes: an input interface configured to receive an output signal $V_{a(T)}$ from a sensor; a prediction circuit configured to generate, on the basis of a relationship, different depending on each of a plurality of converged values $V_c$ corresponding to the respectively different values of a parameter, a plurality of predicted values $V_{b\_T2}$ corresponding to a value of the output signal that would be obtained at a time T2 after a time T1, in a transition response period before a response time period Tr elapses, where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at the time T1; and an estimation circuit configured to generate, on the basis of a value $V_{a\_T2}$ of the output signal obtained at the time T2 and the plurality of predicted values $V_{b\_T2}$, an estimated value Pe of a parameter representing the certain property of the object to be measured.

The signal processing apparatus according to an embodiment of the present invention receives, within a sensor transition response period, an output signal from a sensor, predicts a converged value, and utilizes the predicted value to estimate a property of an object to be measured. The signal processing apparatus according to an embodiment of the present invention evaluates a plurality of predicted values, on the basis of a plurality of converged values $V_c$ corresponding to respectively different values of a parameter representing a property of an object to be measured, from output signal within the transition response period. That is, while the apparatus described in PTL 1 uses a single model selected from a plurality of models to obtain a predicted value, the signal processing apparatus according to an embodiment of the present invention uses a plurality of models to obtain a plurality of predicted values, and after that, selects the most probable predicted value out of the plurality of predicted values and uses that value to estimate the property. Alternatively, the plurality of models are used to obtain the plurality of predicted values, and then, a plurality of probable predicted values are selected and used to estimate the property. Therefore, while in the apparatus described in PTL 1, the accuracy of the predicted value is greatly affected depending on the selected single model, the signal processing apparatus according to an embodiment of the present invention improves the accuracy thereof without being affected in such a manner. As a result, the accuracy of the finally evaluated estimated value also is enhanced. Thus, it is possible to reduce a user waiting time for the signal processing apparatus, and it is possible to highly accurately and very promptly obtain a certain property of an object to be measured.

As an example, there is described a signal processing apparatus below where a gas sensor is used, which is used for evaluating a parameter P indicating a level of maturity (hereinafter, referred to as "maturity degree") of a banana. Thus, a signal processing apparatus according to an embodiment of the present invention and a signal processing method executed thereby will be described. Further, a computer program according to an embodiment of the present invention may cause a computer to execute the above signal processing method.

First and Second Embodiments

FIG. 1 schematically illustrates a configuration of a signal processing apparatus 100A according to a first embodiment of the present invention. The signal processing apparatus 100A includes an input interface 10 configured to receive an output signal $V_{a(T)}$ from a sensor 80, a prediction circuit 20 configured to generate, on the basis of a relationship, different depending on each of a plurality of converged values $V_c$ corresponding to the respectively different parameter values, a plurality of predicted values $V_{b\_T2}$ corresponding to a value of the output signal that would be obtained at a time T2 after a time T1, in a transition response period before a response time period Tr elapses where Tr denotes a response time period required for a value of the output signal $V_{a(T)}$ to become a converged value $V_c$ corresponding to a value P of a parameter representing a certain property of an object to be measured, in accordance with the value of the output signal $V_{a\_T1}$ obtained at the time T1, and an estimation circuit 30 configured to generate, on the basis of the output signal value $V_{a\_T2}$ obtained at the time T2 and the plurality of predicted values $V_{b\_T2}$, an estimated value Pe of a parameter representing the certain property of the object to be measured.

The signal processing apparatus 100A further includes a first memory 40 configured to store a value of the output signal $V_{a(T)}$. The prediction circuit 20 acquires from the first memory 40 the value $V_{a\_T1}$ of the output signal obtained at the time T1 to generate the plurality of predicted values $V_{b\_T2}$, and the estimation circuit 30 acquires from the prediction circuit 20 the plurality of predicted values $V_{b\_T2}$.

Figure 2:
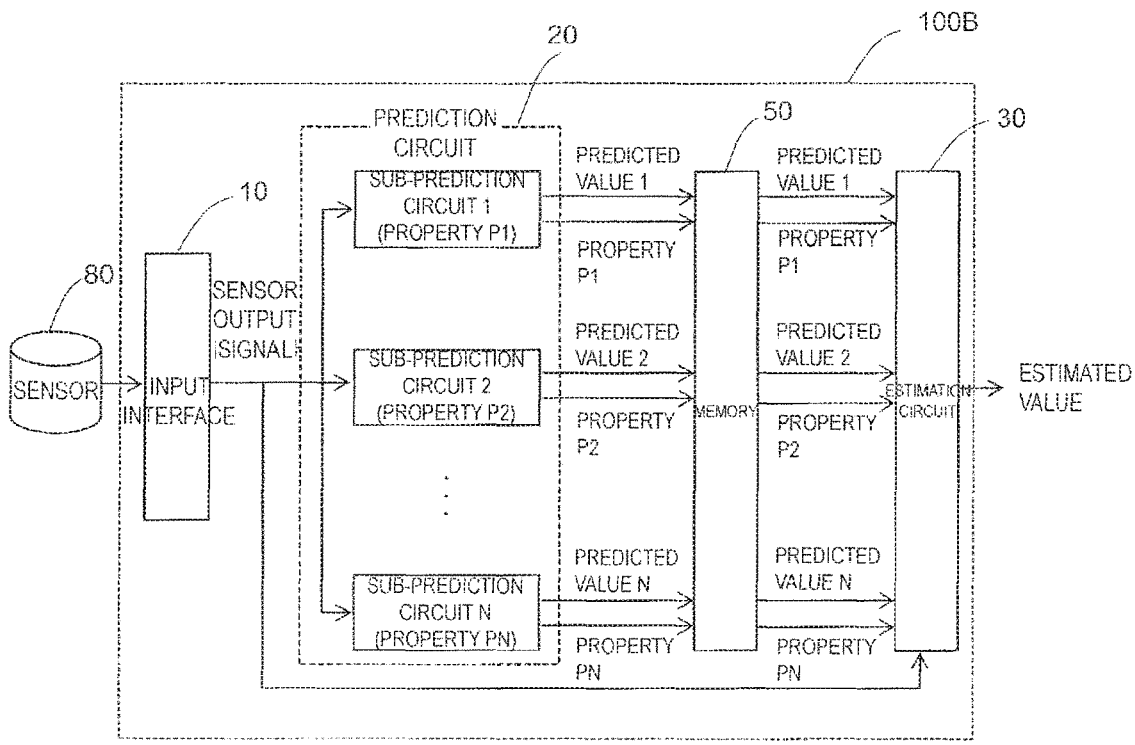
FIG. 2 is a diagram schematically illustrating a configuration of a signal processing apparatus 100B according to a second embodiment of the present invention.

FIG. 2 schematically illustrates a configuration of a signal processing apparatus 100B according to a second embodiment of the present invention. The signal processing apparatus 100B includes, in much the same way as in the signal processing apparatus 100A, an input interface 10 configured to receive an output signal $V_{a(T)}$ from a sensor 80, a prediction circuit 20 configured to generate, in a transition response period before a response time period Tr elapses, where Tr denotes a response time period required for a value of the output signal $V_{a(T)}$ to become a converged value $V_c$ corresponding to a value P of a parameter representing a certain property of an object to be measured, on the basis of the value $V_{a\_T1}$ of the output signal obtained at a time T1 and a plurality of converged values $V_c$ corresponding to the respectively different values of a parameter, a plurality of predicted values $V_{b\_T2}$ corresponding to a value of the output signal that would be obtained at a time T2 after the time T1, and an estimation circuit 30 configured to generate, on the basis of the value $V_{a\_T2}$ of the output signal obtained at the time T2 and the plurality of predicted values $V_{b\_T2}$, an estimated value Pe of a parameter representing the certain property of the object to be measured.

The signal processing apparatus 100B includes, instead of the first memory 40 of the signal processing apparatus 100A, a second memory 50 configured to store a plurality of predicted values $V_{b\_T2}$ and respectively different values P of the parameter in an associated manner. The estimation circuit 30 acquires, from the second memory 50, the plurality of predicted values $V_{b\_T2}$ and the respectively different values P of the parameter.

The first memory 40 provided in the signal processing apparatus 100A may suffice to store the value of the output signal $V_{a(T)}$, and thus, it is possible to reduce a usage amount of a memory compared to the second memory 50, provided in the signal processing apparatus 100B, in which the plurality of predicted values $V_{b\_T2}$ and the respectively different values P of the parameter are stored.

Note that the signal processing apparatuses 100A and 100B are illustrated as an apparatus independent of the sensor 80; however, the signal processing apparatuses 100A and 100B may include the sensor 80.

The prediction circuit 20 includes a plurality of sub-prediction circuits 1 to N, as illustrated in FIG. 1 and FIG. 2, for example. The sub-prediction circuits 1 to N each correspond to values P1 to PN of a parameter representing a certain property of an object to be measured. Note that a plurality of sub-prediction circuits may be designated with the same reference numeral as the prediction circuit 20. Further, the values P1 to PN of a parameter each correspond to different values of a converged value $V_c$ of the output signal from the sensor 80. That is, when the value of the converged value $V_c$ is determined, the value P1 of the parameter corresponding thereto is determined.

Here, "a value of the output signal is converged" means that a difference between a value of the output signal at a certain time after a sufficient time period elapses and a value of the output signal at a time before the certain time, is a value within a prescribed range during a prescribed time period, and the converged value of the output signal is referred to as "converged value". For example, when a sufficient time period elapses means when 500 seconds or more elapses from a start of measurement, a time before a certain time means, for example, a time 50 seconds before the certain time, a prescribed time period is, for example, 100 seconds, and a prescribed range is, for example, 3% of a value of a certain time. An example in which a converged value $V_c$ is evaluated under the above-exemplified condition will be described below, and naturally, a condition to evaluate the converged value $V_c$ is configured appropriately according to a sensor, a required property, and the like.

For example, it is assumed that when the property is a maturity degree of a banana, the parameters P1, P2, P3, P4, P5, and P6 (for example, P1 represents a fully matured state, and P6 represents the least matured state) indicating the maturity degree of a banana correspond to converged values $V_c$=4.6, 4.1, 3.4, 2.6, 1.5, 0.6 V of the output signal of a gas sensor 80.

When an unknown banana smell is measured by the gas sensor 80, it is possible to evaluate the maturity degree of the banana. However, when the response time period Tr after which the value of the output signal $V_{a(T)}$ of the gas sensor 80 reaches the converged value $V_c$ is 600 seconds, for example, it is necessary to wait for 600 seconds or more in order to evaluate the maturity degree of a banana. When the signal processing apparatus 100A or 100B is used, for example, it is possible to evaluate the value P of the parameter representing the maturity degree of a banana about 10 seconds after the measurement is started.

Each sub-prediction circuit 20 generates, in accordance with a value $V_{a\_T1}$ of the output signal obtained at a time T1, on the basis of a relationship, different depending on each of a plurality of converged values Vc corresponding to the respectively different values of the parameter, a predicted value $V_{b\_T2}$ corresponding to a value of the output signal that would be obtained at a time T2 (typically, later by a prescribed time period Tc) after the time T1. Next, on the basis of the value $V_{a\_T2}$ of the output signal obtained at the time T2 and the predicted value $V_{b\_T2}$ obtained at the time T2, an estimated value Pe of the parameter P is generated.

The prediction circuit 20 evaluates an error $V_{e\_T2}$ between the plurality of predicted values $V_{b\_T2}$ and the value $V_{a\_T2}$ of the output signal obtained at the time T2, for example, so as to generate, on the basis of the error $V_{e\_T2}$, the estimated value Pe of an object to be measured. For example, in the six sub-prediction circuits 1 to 6 corresponding to the six parameters P1 to P6, a value of the parameter P corresponding to a sub-prediction circuit having the smallest error $V_{e\_T2}$ between the value of the output signal $V_{a\_T2}$ and the predicted value $V_{b\_T2}$ is generated as the estimated value Pe. The value of the parameter Pe may be any one of the P1 to P6 in this way, alternatively may be a value between the discrete values of the P1 to P6 or a value out of this range which is generated by interpolation or extrapolation calculation. Further, the interpolation or extrapolation calculation may be performed by selecting two or more of the P1 to P6. Naturally, in addition to the error between the predicted value and an actually measured value (value of the output signal $V_{a(T)}$), any relationship between the predicted value and the actually measured value may be used to generate the value of the parameter.

Note that the predicted value may not necessarily be a value evaluated by an operation or the like from the value of the output signal $V_{a(T)}$. For example, when a parameter of the banana to be measured is P1, the value of the output signal $V_{a(T)}$ obtained at the time T1 is too large, and thus, in the sub-prediction circuit 6 corresponding to the parameter P6, the predicted value corresponding to the output signal which may be obtained at the time T2 may not be generated. In such a case, a predicted value in which the estimated value Pe is not P6 may be generated in accordance with a previously determined condition, for example.

Further, a relation between a certain parameter and a predicted value corresponding an output signal that would be obtained in a sub-prediction circuit corresponding to another parameter may be obtained in advance, and when the predicted value of the certain parameter is generated, the predicted value may be generated, on the basis of the relation with the predicted value, in the sub-prediction circuit corresponding to the other parameter.

When it is determined on the basis of the operation described above at the time T2 that it is not possible to generate the estimated value Pe having a high accuracy, for example, when the value of the error $V_{e\_T2}$ is larger than a previously determined value, or the like, the prediction circuit 20 may further generate, in accordance with a value $V_{a\_T3}$ of the output signal obtained at a time T3 after the time T1, on the basis of a relationship, different depending on each of a plurality of converged values $V_c$ corresponding to respectively different values of the parameter, a plurality of predicted values $V_{b\_T4}$ corresponding to a value of the output signal that would be obtained at a time T4 after the time T3. The estimation circuit 30 may evaluate an error $V_{e\_T2}$ between the plurality of predicted values $V_{b\_T2}$ and the value $V_{a\_T2}$ of the output signal obtained at the time T2, and an error $V_{e\_T4}$ between the plurality of predicted values $V_{b\_T4}$ and a value $V_{a\_T4}$ of the output signal obtained at the time T4, so as to generate, on the basis of the error $V_{e\_T2}$, the error $V_{e\_T4}$, or an accumulated value of the errors, the estimated value Pe of the object to be measured. Here, the time T3 and the time T2 may be the same or different. Typically, the time T2 is configured to be later, by a prescribed time period Tc, than the time T1, and the time T4 is configured to be later, by a prescribed time period Tc, than the time T3.

Further, the prediction circuit 20 further generates, in accordance with a value $V_{a\_T1}$ of the output signal obtained at the time T1, on the basis of a relationship, different depending on each of a plurality of converged values $V_c$ corresponding to respectively different values of the parameter, a plurality of predicted values $V_{b\_T5}$ corresponding to a value of the output signal that would be obtained at a time T5 different from the time T2. The estimation circuit 30 may evaluate an error $V_{e\_T2}$ between a plurality of predicted values $V_{b\_T2}$ and the value $V_{a\_T2}$ of the output signal obtained at the time T2 and an error $V_{e\_T5}$ between the plurality of predicted values $V_{b\_T5}$ and the value $V_{a\_T5}$ of the output signal obtained at the time T5, so as to generate, on the basis of the error $V_{e\_T2}$, the error $V_{e\_T5}$, or an accumulated value of the errors, the estimated value Pe of the object to be measured. As a result, it is possible to further improve the accuracy of the estimated value. Here, the time T5 may be before and after the time T2. Typically, the time T2 is configured to be later, by a prescribed time period i*Tc, than the time T1, and the time T5 is configured to be later, by a prescribed time period j*Tc, than the time T1 (I≠j). Note that a plurality of predicted values corresponding to a value of the output signal that would be obtained at a time different from the time T2, not only at the time T5 but also at a plurality of times, may be generated. As a result, it is possible to further improve the accuracy of the estimated value.

The prediction circuit 20 may generate, at each elapse of the prescribed time period Tc, in accordance with a value $V_{a\_Tk}$ (k is an integer of 1 or greater) of the output signal obtained at a certain time, a plurality of predicted values $V_{b\_Tk+1}$ corresponding to a value of the output signal that would be obtained after the prescribed time period Tc from the certain time, and may generate, at each elapse of the prescribed time period Tc, in accordance with a value $V_{a\_Tm}$ (m is an integer of 1 or more) of the output signal obtained at another time different from the certain time, a plurality of predicted values $V_{b\_Tm+1}$ corresponding to a value of the output signal that would be obtained after a prescribed time period Tc from the other time. The estimation circuit 30 may evaluate an error $V_{e\_Tk+1}$ between the plurality of predicted values $V_{b\_Tk+1}$ and the value $V_{a\_Tk+1}$ of the output signal and an error $V_{e\_Tm+1}$ between a plurality of predicted values $V_{b\_Tm+1}$ and the value $V_{a\_Tm+1}$ of the output signal so as to generate, on the basis of the error $V_{e\_Tk+1}$, the error $V_{e\_Tm+1}$, or an accumulated value of the errors, the estimated value Pe of the object to be measured. Here, the other time may be the same as or different from a time after the prescribed time period Tc from the certain time.

The estimated value obtained by the signal processing apparatuses 100A and 100B according to an embodiment increases the accuracy as a time elapses. Therefore, on the basis of the error $V_{e\_Tm+1}$ obtained last or the accumulated value of the errors, the estimated value Pe of the property of the object to be measured may be generated. However, for example, when the value of the error $V_{e\_T4}$ is larger than the value of the error $V_{e\_T2}$ due to an influence of noise included in the output signal, the estimated value Pe of the object to be measured may be generated on the basis of the value of the error $V_{e\_T2}$ in the time T2 before the time T4. Note that a method of generating, on the basis of the accumulated value of the errors, the estimated value Pe of the object to be measured will be described later. For example, on the basis of a minimum value of an absolute value of the accumulated value of the errors, the estimated value Pe may be generated. Further, the accumulated value of the errors may be reset for each previously determined period.

Next, with reference to FIG. 3, a flow will be described in which, in order to generate a plurality of predicted values $V_{b\_T2}$ corresponding to a value of the output signal that would be obtained at the time T2, on the basis of the value $V_{a\_T1}$ of the output signal obtained at the time T1 and the plurality of converged value $V_c$ corresponding to the respectively different values of the parameter, the prediction circuit 20 is caused to learn a prescribed relationship. Here, creating an input and output relationship in the prediction circuit 20 is called learning. The learning may be performed by a user.

Figure 3:
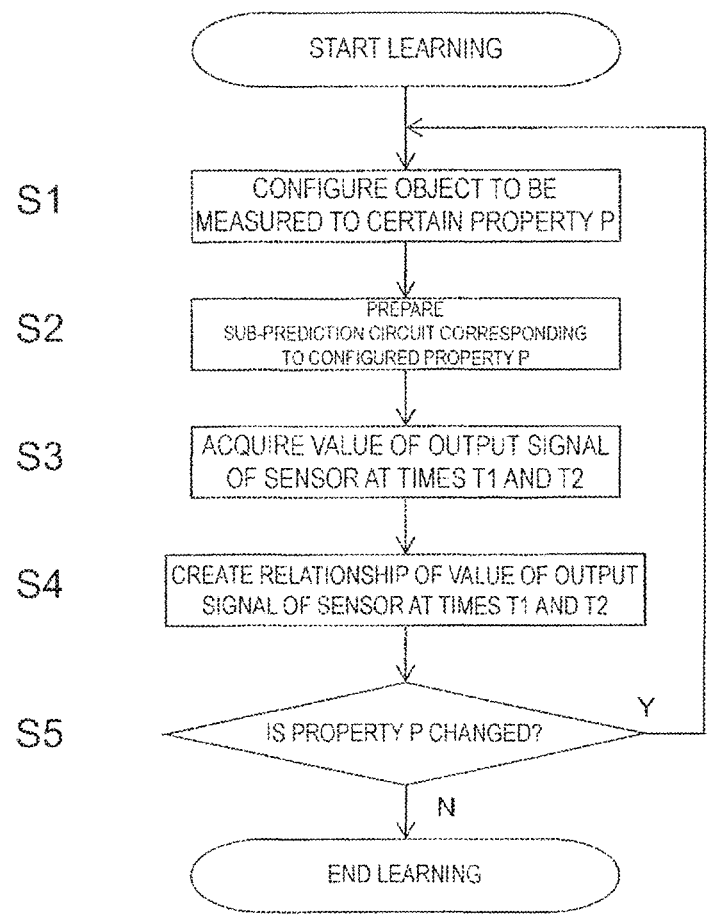
FIG. 3 is a flowchart describing a learning process of a prediction circuit 20.

As illustrated in FIG. 3, firstly, the object to be measured is configured to a certain property P (S1). For example, one banana is selected, out of six bananas having different maturity degrees (values P1 to P6 of the parameter).

The sub-prediction circuit 1 corresponding to the configured property (for example, the value P1 of the parameter) is prepared (S2).

A sensor starts measurement to acquire a value of the output signal $V_{a(T)}$ at the times T1 and T2 (S3). At this time, where necessary, a value of the output signal $V_{a(T)}$ is acquired in a time series manner at each elapse of the prescribed time period Tc.

Next, a relationship between values of the output signal $V_{a(T)}$ at the times T1 and T2 is created (S4). Where necessary, a similar relationship between values of the output signal $V_{a(T)}$ acquired in a time series manner is also created.

During learning, the value of the output signal $V_{a(T)}$ is acquired at a time when necessary, and thus, the value of the output signal $V_{a(T)}$ at a certain time and the value of the output signal $V_{a(T)}$ after a prescribed time period are already known. Therefore, when a certain value is input as a value of the output signal $V_{a(T)}$ of the time T1, a value of the output signal $V_{a(T)}$ of the time T2 is used to generate the predicted value of the time T2. Where necessary, a value of the output signal $V_{a(T)}$ acquired in a time series manner is used to generate a time-series predicted value.

The above learning is repeated by the number of the properties P after changing the property P of the object to be measured (S5).

Thus, the prediction circuit 20 becomes capable of generating the predicted values corresponding to the plurality of properties.

Next, with reference to FIG. 4, a specific example of the learning by the prediction circuit 20 will be described. Description proceeds with an example where, as the sensor 80, a commercially available gas sensor (manufactured by FIS Inc., P-31, for solvent (alcohol, organic solvent)) is used to measure an intensity of a smell of a banana.

The banana differs in intensity of a smell depending on the maturity degree thereof. A graph illustrated in FIG. 4 shows a change over time of the output signal $V_{a(T)}$ obtained from six types of bananas different in maturity degree. A difference in maturity degree of six types of bananas is indicated by property parameters P1 to P6. Further, the parameters P1, P2, P3, P4, P5, and P6 correspond to the converged values $V_c$=4.6, 4.1, 3.4, 2.6, 1.5, 0.6 V of the output signal, respectively.

Figure 4:
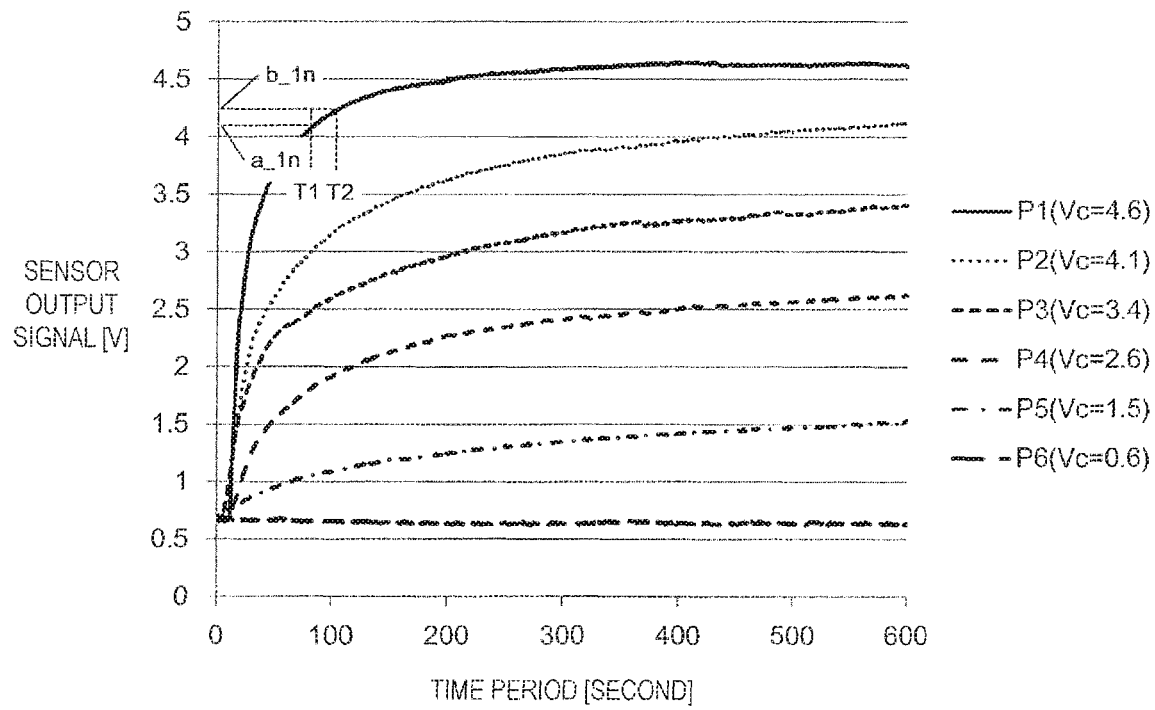
FIG. 4 is a graph illustrating a change over time of a sensor output upon a smell of six types of banana different in maturity degree being measured by a gas sensor.

As understood from FIG. 4, the values of the output signal $V_{a(T)}$ change as a time elapses, and the response time period Tr is about 600 seconds. These values of the output signal are used to perform the learning of the six sub-prediction circuits 1 to 6.

For example, when data in which a value of the output signal obtained at an elapse of 600 seconds is 4.6 V (this data is referred to as property P1) is used to perform the learning of the sub-prediction circuit 1, an input and output relationship is created where a value a_1n of an output signal at a certain time T1 and a value b_1n of an output signal at a time T2(=T1+Tc, Tc is 5 seconds, for example) after a prescribed time period Tc are acquired so that b_1n is output when a_1n is input to the sub-prediction circuit 1. The input and output relationship is shown as in Table 1. The output here is the predicted value. Note that a measurement interval is 0.1 second, for example.

The measurement is performed in each of the six sub-prediction circuits. That is, even when the same value, as the input value, is input to each sub-prediction circuit, each of the predicted values output after 5 seconds differs.

Table 2 is a table showing the input and output relationship of the sub-prediction circuit 6 when data with a value of the output signal at an elapse of 600 seconds being 0.6 V (this data is referred to as property P6) is used to perform the learning of the sub-prediction circuit 6. The input and output relationships for property P2 to P5 are created in much the same way as in Table 1 and Table 2.

Note that when a value not shown in the table is input, for example, when a value between a_10 and a_11 is input to the prediction circuit 20, output may be evaluated by using interpolation such as linear interpolation. Further, when a value other than the value between a_10 and a_11 (for example, a value smaller than a_10) is input to the prediction circuit 20, output may be evaluated by using linear extrapolation or the like.

TABLE 1 property P1 (converged value 4.6 V)

| input | output (predicted value) |
|---|---|
| a_10 | b_10 |
| a_11 | b_11 |
| . | . |
| . | . |
| . | . |
| a_1m | b_1m |

TABLE 2 property P6 (converged value 0.6 V)

| input | output (predicted value) |
|---|---|
| a_60 | b_60 |
| a_61 | b_61 |
| . | . |
| . | . |
| . | . |
| a_6m | b_6m |

The input and output relationship of the estimation circuit 30 will be described. Here, the signal processing apparatus 100B illustrated in FIG. 2 is used, as an example, for description; however, the same applies to the signal processing apparatus 100A except that a location of a memory is different.

Figure 5:
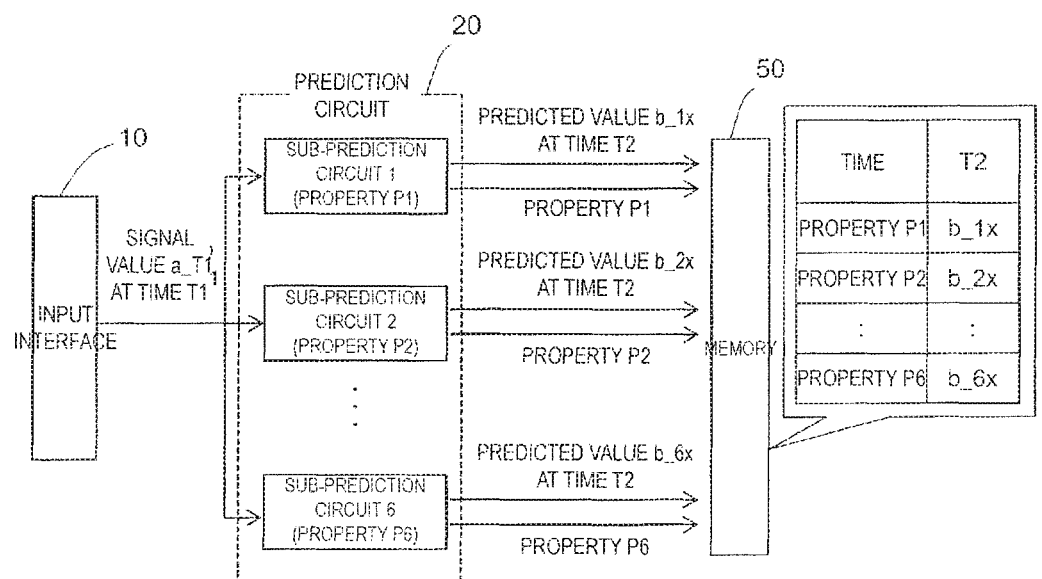
FIG. 5 is a diagram describing an example of an input and output relationship of an estimation circuit 30.

As illustrated in FIG. 5, when the value a_T1 of the output signal (equivalent to the $V_{a\_T1}$ described above; hereinafter, the same applies) at the time T1 is input to each sub-prediction circuit, each sub-prediction circuit generates, on the basis of a learning result, predicted values b_1x, b_2x . . . b_6x (equivalent to the $V_{b\_T1}$ described above respectively corresponding to the properties P1 to P6; hereinafter, the same applies) of the output signal at the time T2 (=T1+Tc) after the prescribed time period Tc.

Figure 6:
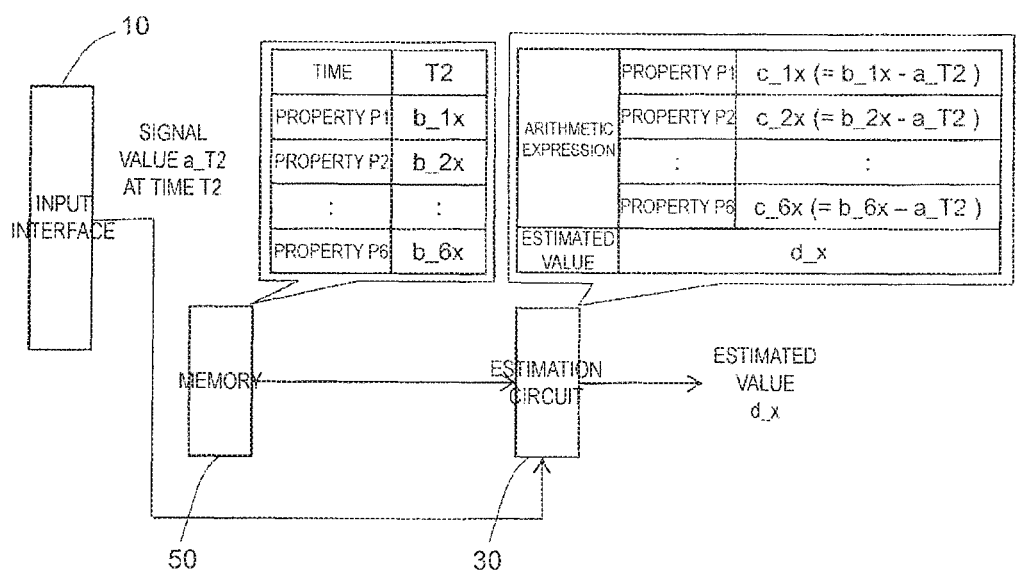
FIG. 6 is a diagram describing an example of an input and output relationship of the estimation circuit 30.

The memory 50 stores, together with the property P to which each sub-prediction circuit corresponds, these predicted values. Then, as illustrated in FIG. 6, at the time T2 (=T+Tc), a value a_(T+Tc) of the output signal is input to the estimation circuit 30 from the input interface 10, and from the memory 50, the predicted values b_1x, b_2x, . . . , b_6x of the output signal at the time T2, and the properties P corresponding thereto are input. Then, the estimation circuit 30 calculates errors c_1x, c_2x, . . . , c_6x (equivalent to the error $V_{e\_T2}$ respectively corresponding to the properties P1 to P6; hereinafter, the same applies) between the predicted value and the output signal.

Then, the estimation circuit 30 has the input and output relationship where the respective properties P and the errors c_1x, c_2x, . . . , c_6x corresponding thereto are input, and the value d_x obtained by estimating the current property P of the object to be measured is output.

Note that when there is input not related to the input and output relationship of the estimation circuit 30, d_x of the output may be evaluated by interpolation such as linear interpolation.

Further, the estimation circuit 30 may perform evaluation by inputting the respective properties P and the errors c_1x, c_2x, . . . , c_6x corresponding thereto to the equation where d_x is the output. The arithmetic expression in this case is obtained in consideration of the various properties P (P1 to 6) rather than being based on a certain one property P, and thus, it is possible to improve the accuracy than an arithmetic expression based on a certain one property P.

Not only an arithmetic expression based on all the properties P but also an arithmetic expression based on a plurality of selected attributes P is capable of obtaining an effect of improving the accuracy than the arithmetic expression based on a certain one property P.

Figure 7:
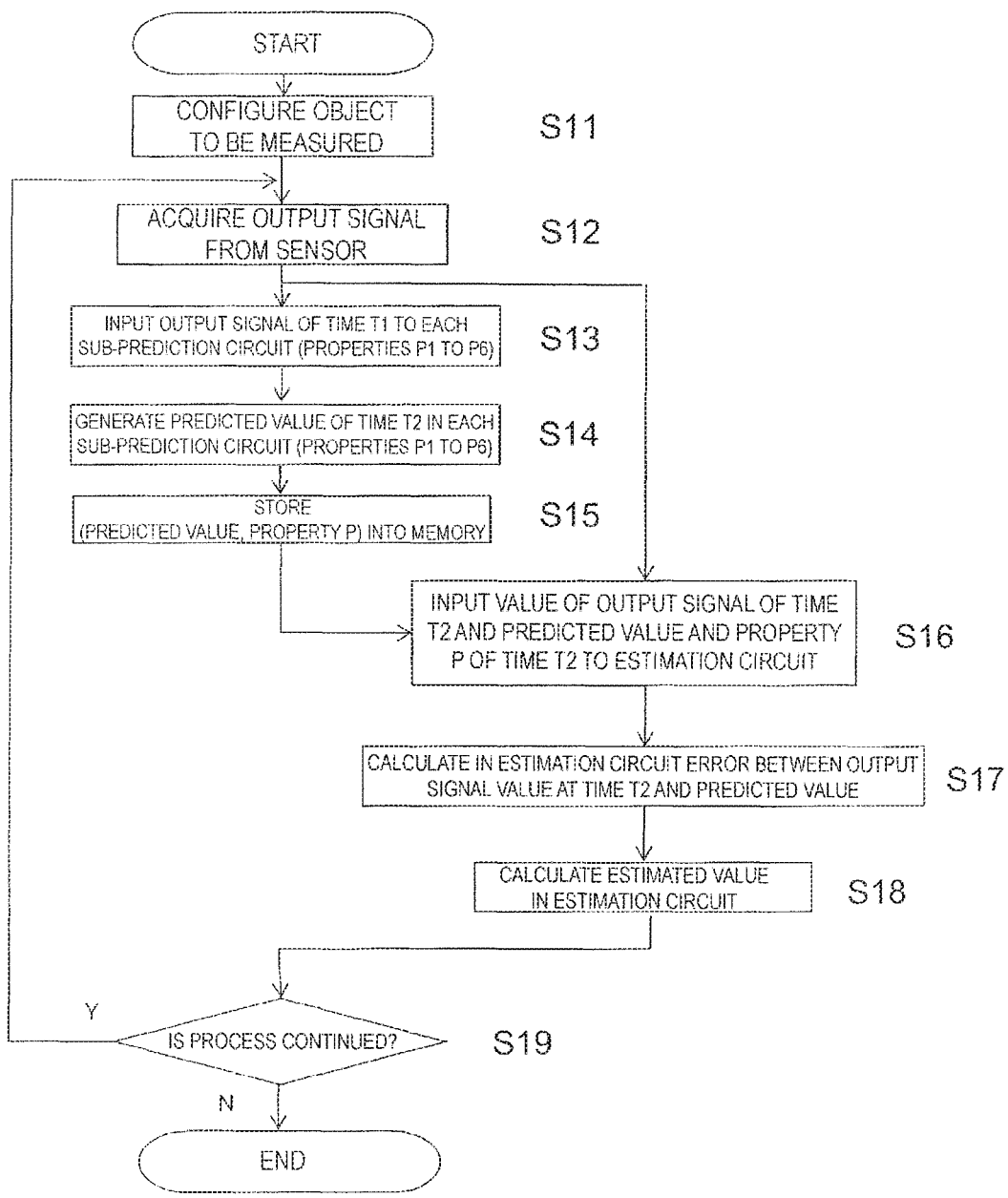
FIG. 7 is a diagram describing a process of estimating a property of an object to be measured.

Next, with reference to FIG. 7, a process of estimating the property of the object to be measured will be described.

Firstly, the object to be measured is configured (S11). The property of the object to be measured is unknown.

Next, the value of the output signal of the sensor 80 that measures the property of the object to be measured is acquired via the input interface 10 (S12).

A value of the output signal at the time T1 is input to each sub-prediction circuit 20 (S13). A value of the output signal is input also to the estimation circuit 30.

Each sub-prediction circuit generates, in accordance with the value of the output signal at the input time T1, the predicted value corresponding to a value of the output signal that would be obtained at the time T2 (S14).

The generated predicted value and the property corresponding to the sub-prediction circuit are associated to each other, and stored in the memory (S15).

To the estimation circuit 30, the value of the output signal at the time T2, the predicted value corresponding to the time T2, and the property P corresponding to the sub-prediction circuit are input from the memory 50 (S16).

The estimation circuit 30 calculates an error between the value of the output signal at the time T2 and the predicted value corresponding to the time T2 (S17).

The estimation circuit 30 receives, as input, the calculated error and the property so as to calculate the estimated value, and generates an estimated result of the property of the object to be measured (S18).

This operation is continued until the end of the measurement (S19).

Figure 8:
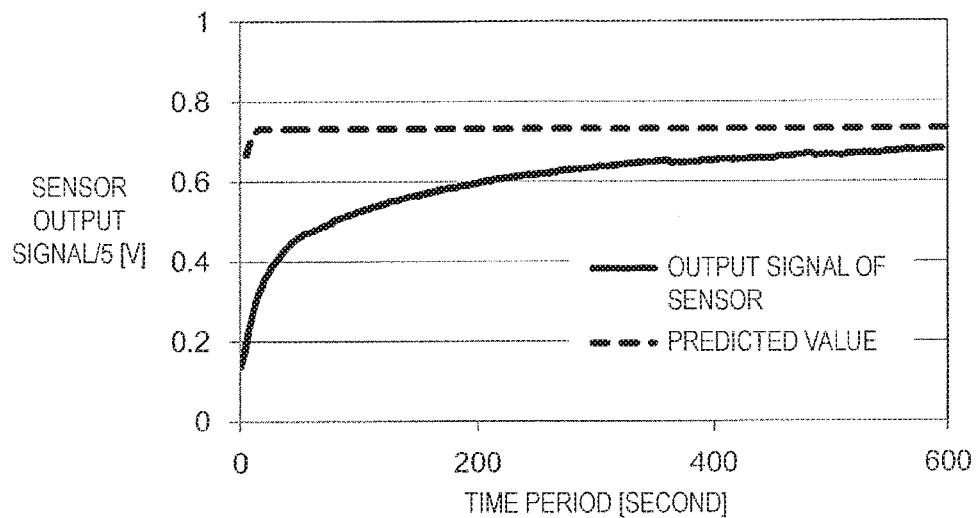
FIG. 8 is a graph illustrating a result obtained by performing estimation by using a signal processing apparatus according to an embodiment of the present invention.

Results obtained by performing estimation on a certain property of the object to be measured (converged value $V_c$ after 600 seconds=about 3.5 V) by using the signal processing apparatus according to an embodiment of the present invention are illustrated in the graph of FIG. 8.

Here, estimation is stopped when a change amount of the estimated value is equal to or less than a prescribed value, and at times subsequent thereto, the estimated values are plotted.

It is understood that a converged value that could be normally known at an elapse of 600 seconds is now successfully estimated at an elapse of about 10 seconds after the start of the measurement, with a value almost equivalent to the converged value.

Note that here, the estimation is stopped until the time at which the converged value is obtained; however, this is not necessary, and when the output signal changes during the process, the estimation may be continuously performed.

As described above, according to an embodiment of the present invention, the plurality of sub-prediction circuits 20 perform the learning in a manner to correspond to the property of each object to be measured. Then, during the estimation of the property of the object to be measured, the output signal is input to the plurality of sub-prediction circuits 20, and the plurality of sub-prediction circuits 20 generates the predicted value after a prescribed time period.

An error between an actually measured value of the output signal after a prescribed time period and the plurality of predicted values is calculated. The plurality of errors and the associated property of the object to be measured are used to calculate the estimated value.

Thus, according to an embodiment of the present invention, the error between the predicted values based on a plurality of models and the actually measured value are used to estimate the property of the object to be measured, and thus, an effect of being capable of improving the accuracy is provided as compared to the estimation through a use of a single model within a category of a certain prescribed range as in PTL 1.

Note that the sensor 80 or the signal processing apparatus 100A or 100B may be connected via a network.

Further, when the sensor 80 are the same in type, the signal processing apparatus 100A or 100B (the prediction circuit 20 and/or the estimation circuit 30) may be shared by another sensor. At this time, when the objects to be measured of the plurality of sensors are regarded as one common property, and the estimated values obtained from the plurality of sensors are compared, it is possible to be used for a sensor defect inspection.

Further, description proceeds with an example where there is one sensor 80; however, this is not limited thereto, and a plurality of sensors of the same type may be used, and a plurality of different types of sensors may be used. At this time, when the input and output relationship of a plurality of sensors for a certain property is configured to the sub-prediction circuit and the estimation circuit, it is possible to perform the process with the same concept as where there is one sensor. When a plurality of sensors are used, a larger quantity of information is obtained, and thus, it is possible to obtain the estimated value with a higher accuracy.

Third Embodiment

Instead of the sub-prediction circuit provided in the signal processing apparatus 100A according to the first embodiment and the prediction circuit 20 provided in the 100B according to the second embodiment, a neural network configured so that the output signal, when the object to be measured is a certain property, is input to generate the predicted value may be used.

Figure 9:
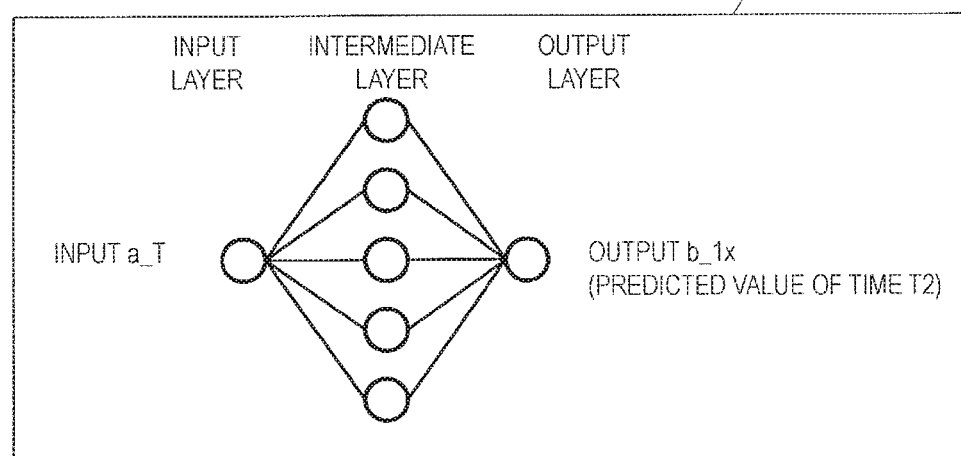
FIG. 9 is a diagram illustrating an example of a configuration of a neural network used as the prediction circuit 20, in a signal processing apparatus according to a third embodiment of the present invention.

An example of a configuration of the neural network is illustrated in FIG. 9. The neural network illustrated in FIG. 9 is a neural network including one node of an input layer, five nodes of an intermediate layer, and one node of an output layer. For example, when the sub-prediction circuit 1 corresponding to the property P1 is input with the output signal a_T at the time T, the learning of the neural network is performed so that b_1x is generated as the predicted value at the time T+Tc. For the learning of the neural network, a generally-known scheme such as back propagation may be used.

When a neural network is concerned where there are one node of an input layer, five nodes of an intermediate layer, and one node of an output layer, the number of parameters required is 16. The breakdown is that there are five weight parameters between the nodes of the input layer and the intermediate layer, five biases of each node of the intermediate layer, five weight parameters between the nodes of the intermediate layer and the output layer, and one bias of the node of the output layer.

In the signal processing apparatuses 100A and 100B, there is an example where the input and output relationship of the prediction circuit (each sub-prediction circuit) 20 is carried in a look-up table-like form (e.g., Table 1, Table 2). Therefore, a quantity of information increases. On the other hand, when the neural network illustrated here as an example is used, it is possible to represent the input and output relationship with the 16 parameters, and thus, it is possible to obtain an effect of reducing the quantity of information. Note that it is possible to use the neural network for the learning of the input and output of the estimation circuit, and likewise, it is possible to obtain an effect of reducing the quantity of information.

Further, it is possible to perform the learning only by applying the input and output relationship, and thus, it is possible to simplify the configuration of the prediction circuit. Note that the number of intermediate layers and/or the number of the nodes of the intermediate layers are not limited to the number described as an example. When the numbers are increased, it is possible to improve the accuracy of the predicted value.

Further, the input and output relationship of the prediction circuit (each sub-prediction circuit) 20 may be represented with an approximate expression. As a result, as compared to a case where the relationship is carried with a look-up table-like form (for example, Table 1, Table 2), it is possible to obtain an effect of reducing the quantity of information.

Fourth Embodiment

The estimation circuit 30 provided in the signal processing apparatus according to the above-described first to third embodiments generate, as described with reference to FIG. 5 and FIG. 6, the estimated value on a direct basis of the error between the output signal and the predicted value. When generating the estimated value on the basis of the error between the output signal and the predicted value, the error may be directly utilized. In addition, as in the estimation circuit 30 illustrated in a fourth embodiment, the estimated value may also be generated on the basis of the accumulated value of the errors.

Figure 10:
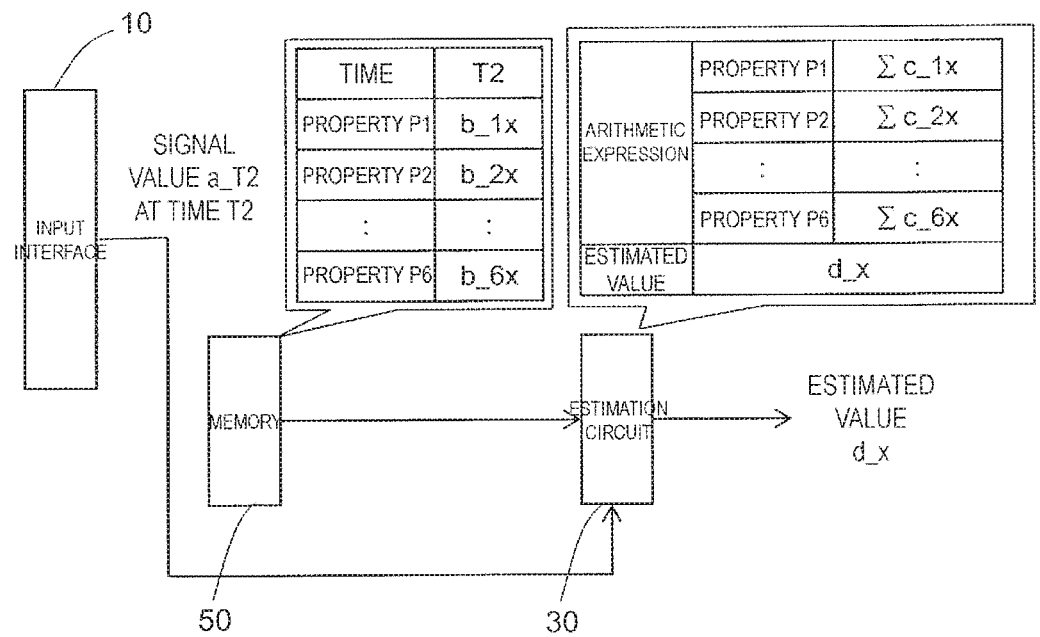
FIG. 10 is a diagram illustrating a configuration of an estimation circuit configured to generate an estimated value on the basis of an accumulated value of errors between an output signal and a predicted value, where the estimation circuit is provided in a signal processing apparatus according to fourth and fifth embodiments of the present invention.

As illustrated in FIG. 10, the estimation circuit 30 provided in the signal processing apparatus according to the fourth embodiment is configured so that the estimated value of a property of the object to be measured is generated, in accordance with the output signal, on the basis of the accumulated value of the errors of the predicted value. Specifically, the estimation circuit 30 calculates, as described above, the errors ($c\_1x, c\_2x, \ldots, c\_6x$) between the predicted value and the output signal input from the memory, so as to generate the accumulated value (represented by "/") of the error corresponding to each property over the measurement (i.e., over a plurality of times), and receive, as input, the accumulated value of the errors to generate the estimated value of the property of the object to be measured.

Figure 11:
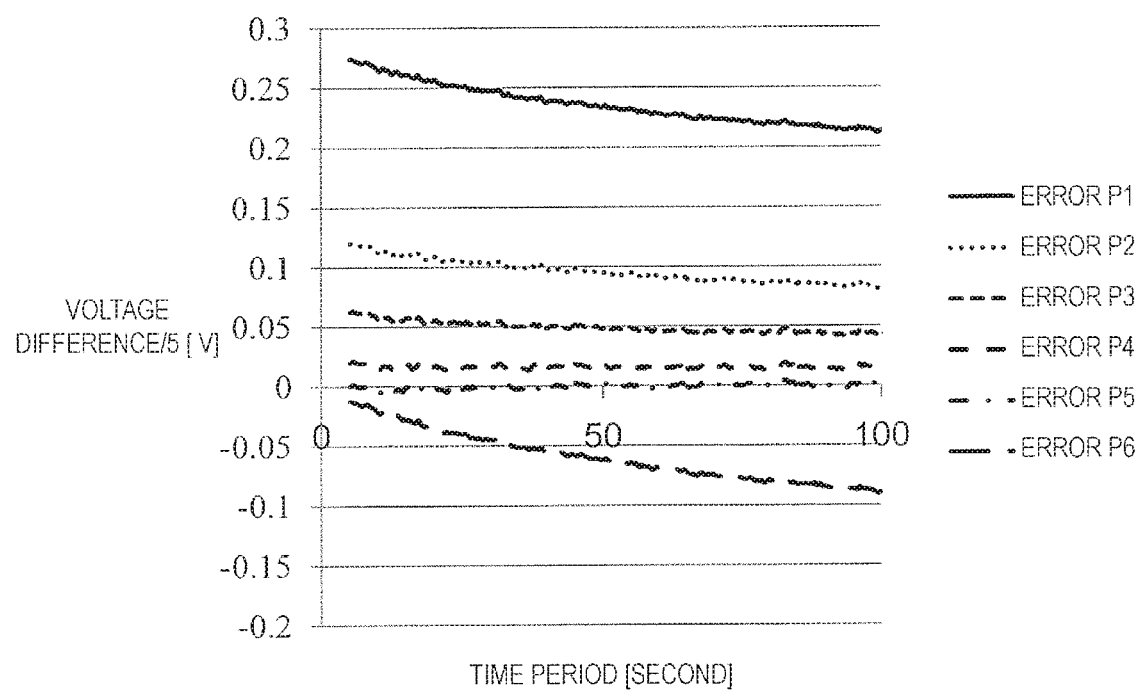
FIG. 11 is a graph illustrating a change over time of an error between a predicted value and an output signal when a property of an object to be measured is P5 (converged value $V_c$ after 600 seconds=about 1.5 V).

FIG. 11 is a graph illustrating a change over time of the error between the predicted value output from each sub-prediction circuit 20 and the output signal corresponding to the time, when the property of the object to be measured is P5 (converged value $V_c$ after 600 seconds=about 1.5 V).

Figure 12:
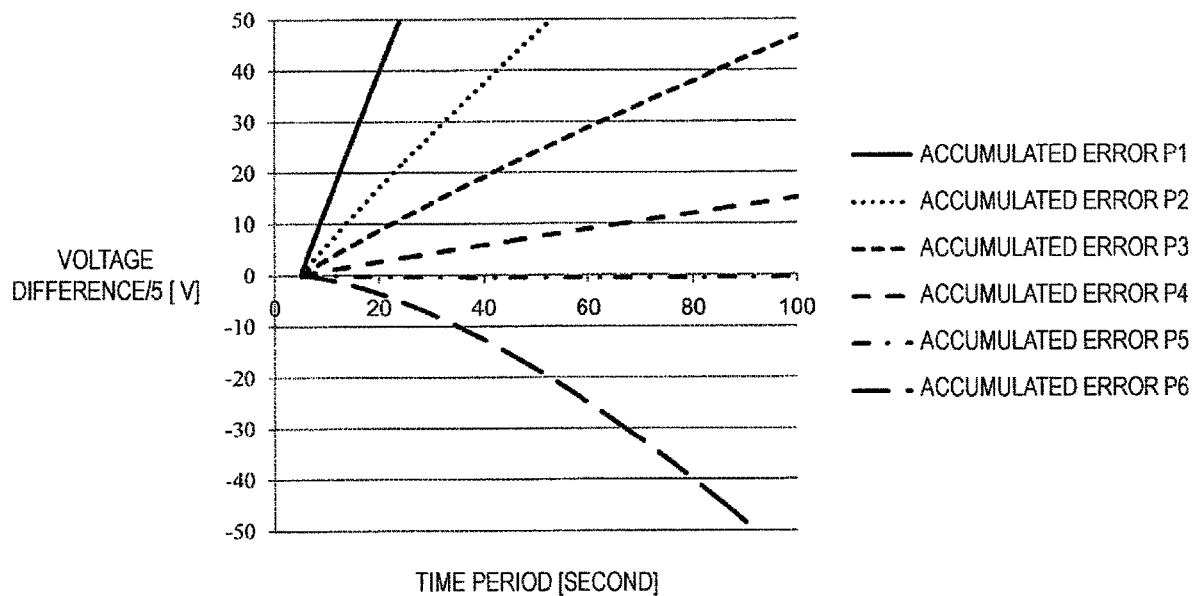
FIG. 12 is a graph illustrating a change over time of the accumulated value of the errors of FIG. 11.

FIG. 12 is a graph illustrating a change over time of the accumulated value of the errors of FIG. 11. The object to be measured is the property P5, and thus, the error between the predicted value 5 corresponding to the property ant the output signal is almost 0 at any time, hence the accumulated error of almost 0. On the other hand, in the other properties (P1 to P4 and P6), the accumulated errors increase in absolute value as a time elapses. Further, as understood from FIG. 12, the change of the accumulated errors is almost linear. Therefore, when the relationship between each property and the accumulated errors is used, it is possible to generate the estimated value of the property of the object to be measured with the linear interpolation.

For example, when at a certain time, the accumulated error of the property P4 (converged value Vv after 600 seconds=about 2.6 V) relative to the property P6 (converged value $V_c$ after 600 seconds=about 0.6 V) is 1:2 with respect to the accumulated value 0, it is possible to calculate, as the estimated value, the property where the converged value $V_c$ after 600 seconds is about 1.3 V(=(2.6×1+0.6×2)/3), with the linear interpolation as the property between the property P4 and the property P6. For the linear interpolation, any two accumulated errors may be used, and on the basis of the three or more accumulated errors, the estimated value may be calculated.

It is possible to generate the estimated value of the property of the object to be measured with the linear interpolation, and thus, it is possible to generate the estimated value with high accuracy, and the estimation circuit 30 is capable of eliminating a need of having the input and output relationship in a table format as described above, and thus, it is possible to reduce a usage amount of the memory in the estimation circuit 30.

Fifth Embodiment

The estimation circuit 30 provided in the signal processing apparatus according to a fifth embodiment generates, in much the same way as the estimation circuit 30 according to the fourth embodiment does, the estimated value on the basis of the accumulated value of the errors. However, the estimation circuit 30 provided in the signal processing apparatus according to the fifth embodiment is configured to select an accumulated value having a minimum absolute value from each of an accumulated value having a positive value and an accumulated value having a negative value, out of a plurality of accumulated values of the errors, and generate, on the basis of the accumulated values having the minimum positive and negative absolute value, and the properties corresponding thereto, the estimated value of the property of the object to be measured.

In an example illustrated in FIG. 12, out of a plurality of accumulated values of the errors, as the accumulated value having a positive value and the minimum absolute value, the accumulated value corresponding to the property P4 is selected, as the accumulated value having a negative value and the minimum absolute value, the accumulated value according to the property P5 is selected, and on the basis of these accumulated values, the estimated value is generated. Note that the predicted value to be selected may be changed depending on each time.

When the estimated value of the property of the object to be measured is generated with the linear interpolation, when selecting, out of the property having a positive value of the accumulated value of the errors and the property having a negative value thereof, two properties each having the absolute value with the minimum value (close to 0), it is possible to improve the accuracy of estimation as compared to a case where a combination of another property is selected.

Sixth Embodiment

Figure 13:
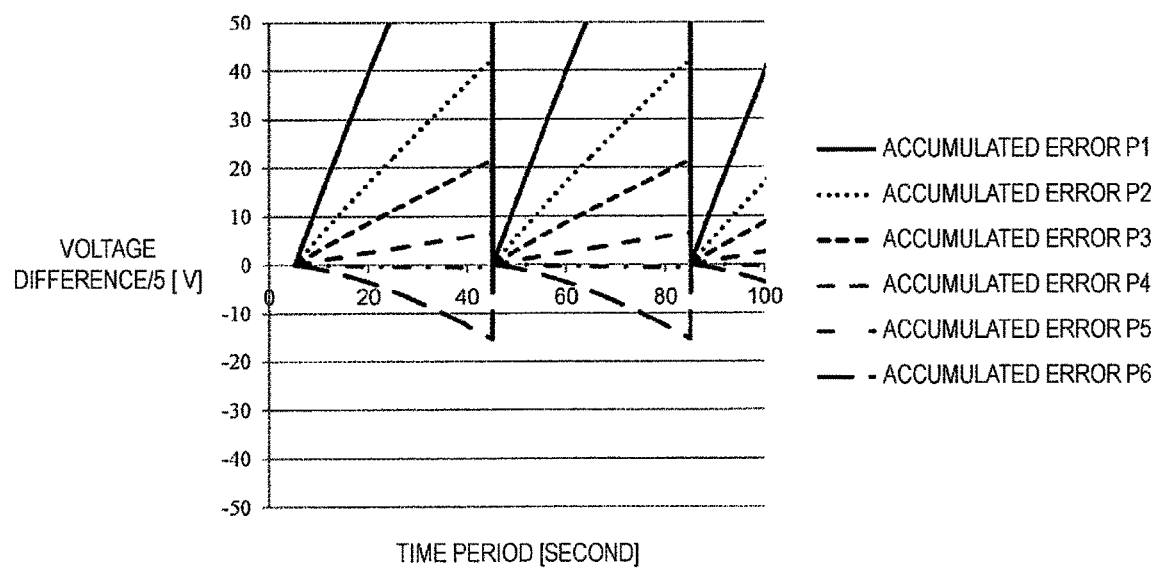
FIG. 13 is a graph illustrating a change over time of accumulated errors upon an accumulated error being reset for each constant period, in the estimation circuit 30 of the signal processing apparatus according to a sixth embodiment of the present invention.

The estimation circuit 30 of the signal processing apparatus according to the fourth embodiment and the fifth embodiment obtains the accumulated value of the errors over a whole measurement period, and on the basis thereof, generates the estimated value. On the other hand, the estimation circuit of the signal processing apparatus according to a sixth embodiment is configured to reset the accumulated value at a certain determined timing, here, at an elapse of a certain time period. The accumulated value of the errors between the predicted value input from each sub-prediction circuit 20 and the output signal corresponding to the time is as illustrated in FIG. 13, for example.

For example, when there occurs a change in the property of the object to be measured at a certain mid-point during the process, a result of the property before the change is left in the accumulated errors. Therefore, an estimation error of the property after the change is large. To resolve this, when the accumulated value is reset at a certain determined timing, it is possible to reduce the error of the estimated value even when the property of the object to be measured is changed. Note that the "certain determined timing" may be a prescribed time interval, and any time interval. Further, the accumulated value may be reset in response to any operation such as a magnitude of an input change to another sensor (for example, a temperature sensor) or a reset request from a user.

Seventh Embodiment

Figure 14:
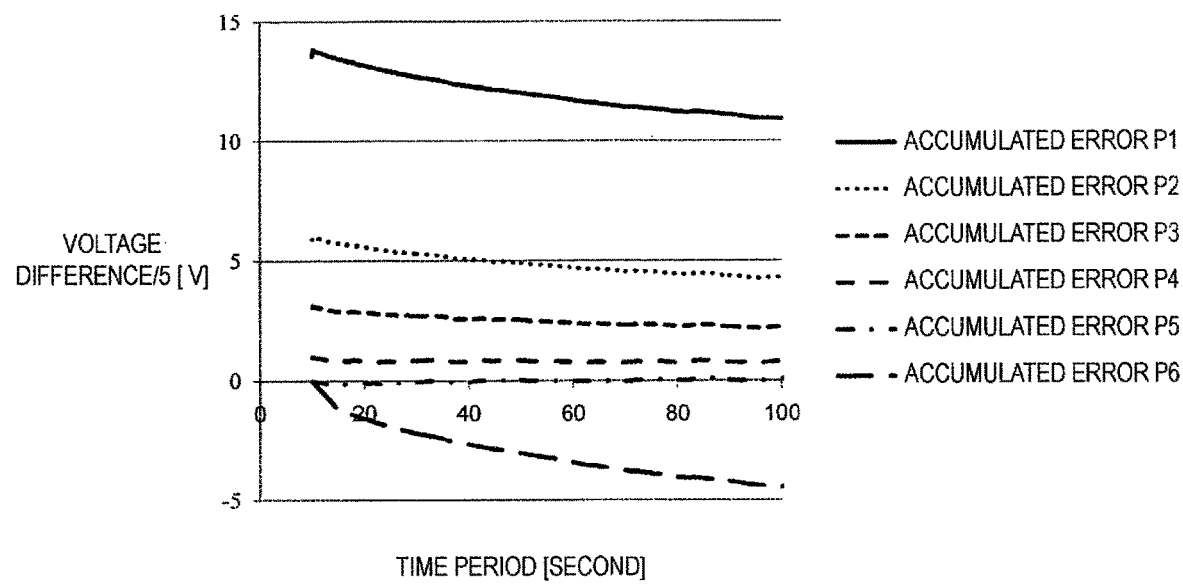
FIG. 14 is a graph illustrating a change over time of an accumulated error upon an error being accumulated just during a prescribed time period, in an estimation circuit 30 of the signal processing apparatus according to a seventh embodiment of the present invention.

The estimation circuit 30 of the signal processing apparatus according to a seventh embodiment accumulates an error in a prescribed time period only, and on the basis thereof, generates the estimated value. The change over time of the accumulated error generated in thus-configured estimation circuit 30 is illustrated in FIG. 14. Here, a measurement interval is 0.1 second, and an error for five seconds is accumulated. It is known that as compared to the errors P1 to P6 in FIG. 11, the accumulated errors P1 to P6 in FIG. 14 are decreased in noise carried over a signal. That is, the estimation circuit 30 of the signal processing apparatus according to the seventh embodiment is capable of generating the estimated value with high accuracy compared with the estimation circuit 30 of the signal processing apparatus according to the fourth embodiment. Further, the signal processing apparatus according to the seventh embodiment is capable of reducing, in much the same way as the signal processing apparatus according to the sixth embodiment, the error of the estimated value even when the property of the object to be measured is changed, for example.

Note that upon the use of the accumulated value in order to generate the estimated value as in the signal processing apparatus according to the fourth to seventh embodiments, when the error obtained at a certain time is a value exceeding a prescribed range due to, for example, noise or the like, a process of not accumulating the error may be added.

Eighth Embodiment

Each sub-prediction circuit provided in the prediction circuit 20 provided in the signal processing apparatuses 100A and 100B according to the above embodiments may further include a function of updating (changing) the predicted value corresponding to the value of the output signal. For example, when a package structure of a sensor differs as in the sensors 80A and 80B illustrated in FIG. 16 and FIG. 17, a sensor response time changes, and thus, it is preferable to provide a function of updating (changing) the predicted value depending on the package structure.

Figure 16:
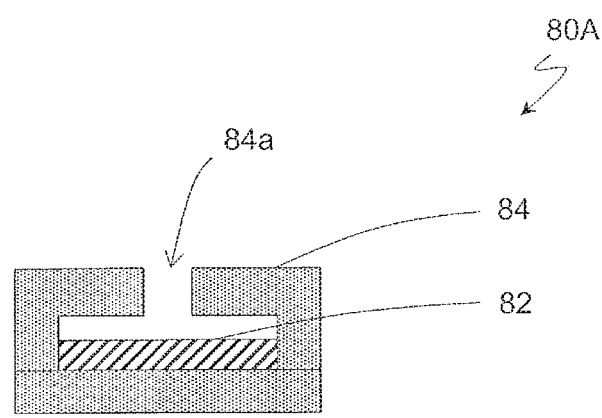
FIG. 16 is a schematic cross-sectional view of a sensor 80A.
Figure 17:
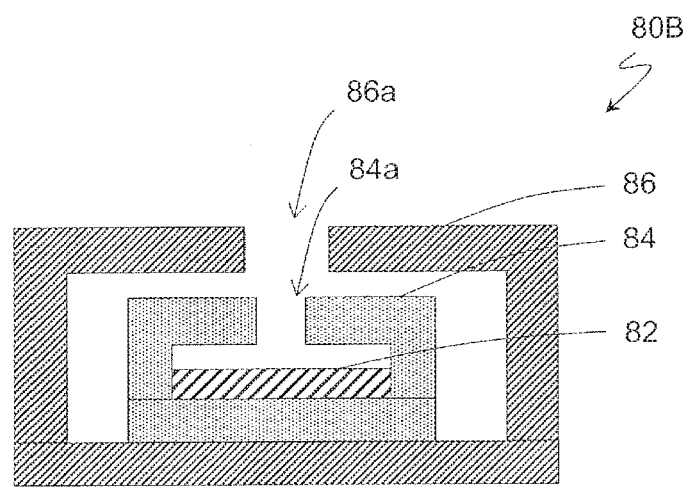
FIG. 17 is a schematic cross-sectional view of a sensor 80B.

FIG. 16 illustrates a schematic cross-sectional view of the sensor 80A, and FIG. 17 illustrates a schematic cross-sectional view of the sensor 80B. The sensors 80A and 80B are both used, as the sensor 80, in the above-described embodiments.

The sensor 80A illustrated in FIG. 16 includes a sensor chip (response unit) 82 and a package 84 configured to protect the response unit 82. The package 84 includes an opening portion (intake port 84a), and the remaining portion other than the intake port 84a is formed of a ceramic plate, a metal plate, or a plastic plate. When the response unit 82 is arranged within the package 84, a time period required until the smell of a banana reaches the response unit 82 changes depending on each structure of the intake port 84a of the package 84. Therefore, the response time period until the converged value is reached changes depending on each structure of the package 84.

Further, when in addition to the package 84, an additional package 86 is provided as in the sensor 80B illustrated in FIG. 17, the structure of the opening portion (intake port 86a) provided in the additional package 86 also affects the response time period. Therefore, the response time period until the converged value is reached also changes depending on each structure of the additional package 86. Note that the package 86 is also formed of a ceramic plate, a metal plate, or a plastic plate.

For example, on the basis of the output signal $V_{a(T)}$ from the sensor 80A, in the signal processing apparatus that creates a plurality of predicted values $V_{b\_T2}$ corresponding to a value of the output signal that would be obtained at the time T2 after the time T1, when the package structure of the sensor 80A is changed to the package structure of the sensor 80B, there occurs an error between the predicted value of the output signal that would be obtained at the time T2 after the time T1 and a value of the output signal obtained at the time T2. As a result, it is not possible to generate a correct estimated value. Therefore, in order that the correct estimated value is generated, a function of updating a plurality of predicted values $V_{b\_T2}$ is imparted to the signal processing apparatus.

Figure 18:
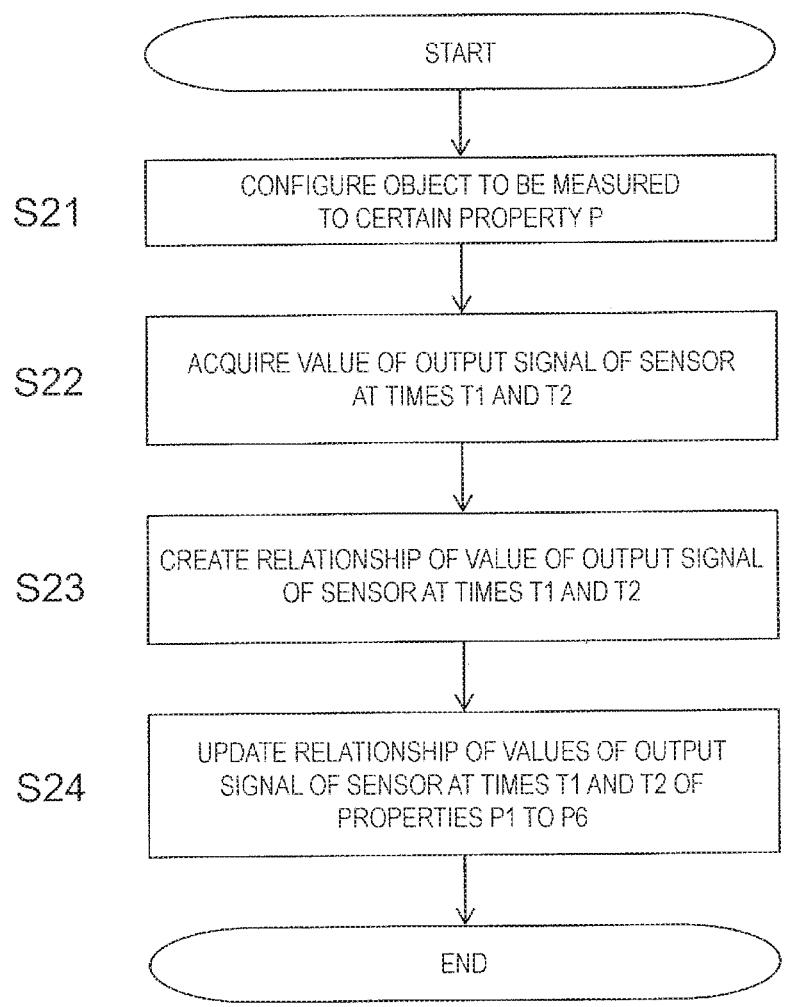
FIG. 18 is a diagram describing a process of updating a plurality of predicted values.

With reference to FIG. 18, a process of updating the plurality of predicted values will be described.

Firstly, the object to be measured is configured (S21). The property of the object to be measured may be any one of P1 to P6, and any P.

The sensor 80B starts the measurement to acquire the values of the output signal at the times T1 and T2 (S22). At this time, where necessary, a value of the output signal is acquired in a time series manner at each prescribed time period Tc.

Next, the relationship between the values of the output signal at the times T1 and T2 is created (S23). Where necessary, a relationship between the values of the output signal acquired in a time series is similarly created.

Then, on the basis of the relationship, created in S23, between the values of the output signal at the times T1 and T2, the already-created relationship between the values of the output signal at the times T1 and T2 of the properties P1 to P6 is updated (S24).

Thus, the prediction circuit 20 is capable of generating the predicted value corresponding to a plurality of properties even when the package in which the sensor is placed is changed.

In the above description, a certain one property P is configured; however, in a plurality of properties, a relationship between the values of the output signal at the times T1 and T2 is created, and a relationship between the values of the output signal at the times T1 and T2 of the properties P1 to P6 may be updated.

As a method of updating, a parameter related to the response time period is derived from the relationship between the values of the output signal at the times T1 and T2 created in S23, and on the basis of the value of the parameter, a parameter related to the response time period of the relationship between the values of the output signal at the times T1 and T2 of the properties P1 to P6 may be updated. During that time, on the basis of the measurement result during a prescribed time period, a value of a certain parameter may be determined, and the parameter may be updated to the value, and the value of the parameter may be gradually changed by each prescribed value.

After the update, the process of the prediction circuit 20 is performed by using a new predicted value.

Thus, when the function of updating the predicted value is provided, it is possible to generate a correct estimated value even when a structure surrounding the response unit 82 of the sensor is changed, as in the change of the package structure illustrated here.

Figure 15:
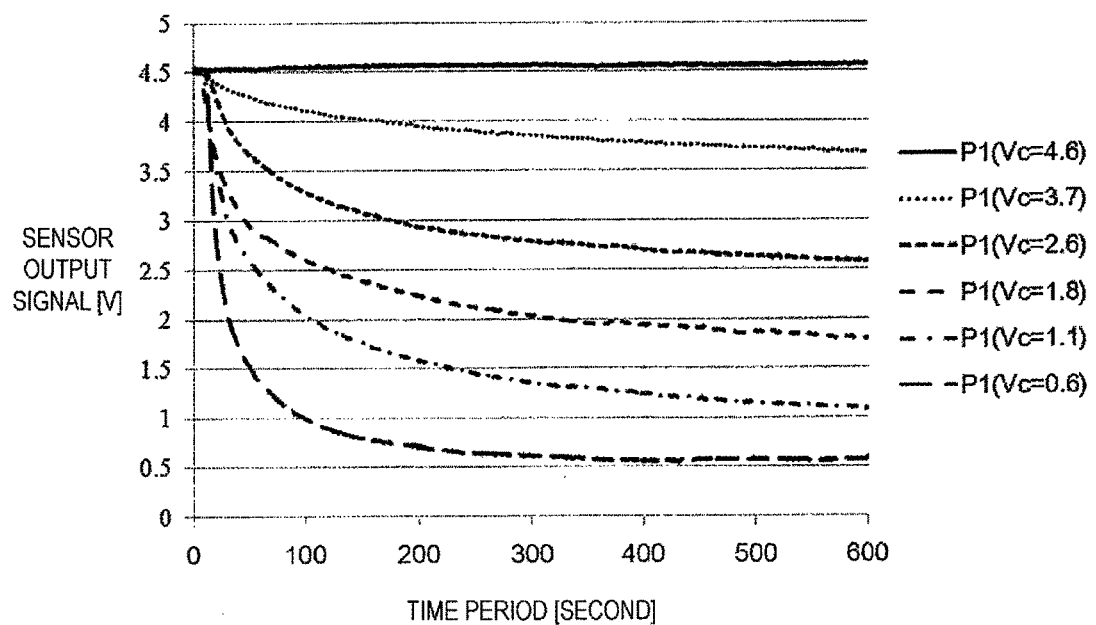
FIG. 15 is a graph illustrating a change over time of an output signal where a value of the output signal decreases in a transition response period.

In the above description, an example where the value of the output signal increases in the transition response period is described, and as illustrated in FIG. 15, even when the value of the output signal decreases in the transition response period, it is possible to use the signal processing apparatus according to the first to eighth embodiments of the present invention and a signal processing apparatus obtained by modifying such a signal processing apparatus.

Further, upon combination of the signal processing apparatuses when the value of the output signal increases and decreases in the transition response period, it is possible to generate a correct estimated value even when the value of the output signal increases or decreases in the transition response time period.

A signal processing method executed by the signal processing apparatus according to the above-described embodiments of the present invention may be also executed by a computer. A program according to the embodiments of the present invention is capable of causing a computer to execute the above-described signal processing method, or may cause a computer to function as the above-described signal processing apparatus. The computer may be a plurality of computers connected via a network. Examples of the computer may include a smart phone, a tablet, a smart watch (wrist watch-type device capable of being attached to an arm with a function of an arithmetic operation and communication in addition to a watch), and a wearable device. In this case, the generated estimated value of the parameter may be directly displayed to a display device of a smart phone, a tablet, a smart watch, and a wearable device. Secondary information (for example, when the estimated value of the parameter is the maturity degree of a banana, the secondary information is health information related to the maturity degree of a banana, and the like) obtained by processing the generated estimated value of the parameter may be displayed. The secondary information may be acquired from a network, for example.

Note that in the above-described embodiments, description proceeds with an example where a banana is used as the object to be measured to estimate the maturity degree of a banana; however, the object to be measured and the parameter to be estimated are not limited thereto and may be widely applied. For example, the object to be measured includes another food, the parameter to be estimated includes a good timing of eating (a perfect time to eat) or the like, the object to be measured includes an atmosphere, and the parameter to be estimated includes a humidity, a temperature, a barometric pressure or the like.

When the object to be measured is a food, a user is capable of promptly knowing a good timing of eating without a need of waiting for the response time period to elapse. Therefore, for example, when the signal processing apparatus is used in a supermarket, it is possible to select and purchase a food material ready to be eaten.

Further, when the food material is a fruit, by using the signal processing apparatus in a farm and a fruit sorting place to estimate a good timing of eating such as a maturity degree, it is possible to decide a date and a time when to gather and ship the fruit, to select a shipping location (such as near or far), and to decide a freshness date and a quality guaranteed period.

Further, when the object to be measured is an atmosphere and the parameter to be estimated is environmental information such as a humidity, a temperature, and a barometric pressure, if a user moves to a place where an environmental condition is likely to change such as indoor to outdoor or when a user extracts the signal processing apparatus from a bag or a pocket, then it is possible to promptly know environmental information such as a changed humidity, temperature, and barometric pressure without a need of waiting for the response time period to elapse.

Therefore, it is possible to promptly provide a user with environmental information such as a humidity, a temperature, a barometric pressure and the like, and in addition, possible to provide secondary information on a health based on the environmental information such as a humidity, a temperature, a barometric pressure and the like, for example, information on prevention of heat stroke, prevention of flu, and a skin dry, when the temperature and the humidity are concerned, and secondary information such as a call for attention such as a headache, an arthralgia, and an influence on old wound when the barometric pressure is concerned.

Further, even when the object to be measured is a human body and the parameter to be estimated is bio-information such as a body temperature and a sweat rate, it is possible to promptly know the bio-information such as a changed body temperature and sweat rate without a need of waiting for the response time period to elapse.

Further, the signal processing apparatus may be assembled into a cooking apparatus such as a microwave oven. In this case, the output signal of a sensor configured to detect a vapor output from a food material is used to estimate a cooking situation of the food material. As a result, it is possible to know a cooking situation of a food material in the transition response period without a need of waiting for the response period to elapse, and thus, it is possible to prevent a cooking failure such as overheating and overcooking to ensure a good timing of eating.

Further, the signal processing apparatus may be assembled into an air conditioner such as an air conditioner, a dehumidifier, a humidifier, and an air purifier. In this case, the output signal of a sensor configured to detect a temperature, a humidity, a smell, a soil or the like of a surrounding environment is used to estimate a situation of the surrounding environment.

As a result, it is possible to know a temperature, a humidity, a smell, and a soil of a surrounding environment in the transition response period without a need of waiting for a response time period to elapse and thus, it is possible to promptly start control of an air conditioning and air purification and the like. As a result, it is possible to promptly provide a user with a comfortable environment.

Description proceeds with an example where in the signal processing apparatus and the signal processing method according to the above-described embodiments, the gas sensor is used as the sensor 80; however, the sensor 80 is not limited thereto, and the description may be applied to a wide range of signal processing such as a sensor using a semiconductor having a relatively long response time period or a sensor (for example, a humidity sensor, and a temperature sensor) using an electrostatic capacity or the like.

The present specification discloses a signal processing apparatus, a signal processing method, and a computer program according to the following items.

Item 1

A signal processing apparatus including: an input interface configured to receive an output signal $V_{a(T)}$ from a sensor; a prediction circuit configured to generate, on the basis of a relationship, different depending on each of a plurality of converged values $V_c$ corresponding to the respectively different values of a parameter, a plurality of predicted values $V_{b\_T2}$ corresponding to a value of the output signal that would be obtained at a time T2 after a time T1, in a transition response period before a response time period Tr elapses, where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at the time T1; and an estimation circuit configured to generate, on the basis a value $V_{a\_T2}$ of the output signal obtained at the time T2 and the plurality of predicted values $V_{b\_T2}$, an estimated value Pe of a parameter representing the certain property of the object to be measured.

In accordance with the signal processing apparatus according to Item 1, it is possible to evaluate relatively easily and sufficiently accurately an estimated value on the basis of an output signal from a sensor. Thus, it is possible to reduce a user waiting time for the signal processing apparatus, and it is possible to highly accurately and very promptly obtain a certain property of an object to be measured.

Item 2

The signal processing apparatus according to Item 1 further including a first memory configured to store a value of the output signal $V_{a(T)}$. The prediction circuit acquires from the first memory the value $V_{a\_T1}$ of the output signal obtained at the time T1 to generate the plurality of predicted values $V_{b\_T2}$, and the estimation circuit acquires from the prediction circuit the plurality of predicted values $V_{b\_T2}$.

In accordance with the signal processing apparatus according to Item 2, it is possible to relatively reduce a capacity of the first memory.

Item 3

The signal processing apparatus according to Item 1 further including a second memory configured to store the plurality of predicted values $V_{b\_T2}$ and the respectively different values P of the parameter in an associated manner. The estimation circuit acquires the plurality of predicted values $V_{b\_T2}$ and the respectively different values P of the parameter from the second memory.

In accordance with the signal processing apparatus according to Item 3, a variation of the signal processing apparatus is provided.

Item 4

The signal processing apparatus according to any one of Items 1 to 3, in which the estimation circuit evaluates an error $V_{e\_T2}$ between the plurality of predicted values $V_{b\_T2}$ and the value $V_{a\_T2}$ of the output signal obtained at the time T2 to generate, on the basis of the error $V_{e\_T2}$, the estimated value Pe of the object to be measured.

In accordance with the signal processing apparatus according to Item 4, a variation of the signal processing apparatus is provided.

Item 5

The signal processing apparatus according to any one of Items 1 to 4, in which in accordance with a value $V_{a\_T3}$ of the output signal obtained at a time T3 after the time T1, the prediction circuit further generates, on the basis of a relationship, different depending on each of a plurality of converged values $V_c$ corresponding to the respectively different values of the parameter, a plurality of predicted values $V_{b\_T4}$ corresponding to a value of the output signal that would be obtained at a time T4 after the time T3.

In accordance with the signal processing apparatus according to Item 5, it is possible to obtain an estimated value having a higher accuracy.

Item 6

The signal processing apparatus according to any one of Items 1 to 4, in which in accordance with a value $V_{a\_T3}$ of the output signal obtained at a time T3 after the time T1, the prediction circuit further generates, on the basis of a relationship, different depending on each of a plurality of converged values $V_c$ corresponding to the respectively different values of the parameter, a plurality of predicted values $V_{b\_T4}$ corresponding to a value of the output signal that would be obtained at a time T4 after the time T3. The estimation circuit evaluates an error $V_{e\_T2}$ between the plurality of predicted values $V_{b\_T2}$ and the value $V_{a\_T2}$ of the output signal obtained at the time T2, and an error $V_{e\_T4}$ between the plurality of predicted values $V_{b\_T4}$ and the value $V_{a\_T4}$ of the output signal obtained at the time T4 so as to generate, on the basis of the error $V_{e\_T2}$, the error $V_{e\_T4}$, or an accumulated value of the errors, the estimated value Pe of the object to be measured.

In accordance with the signal processing apparatus according to Item 6, it is possible to obtain an estimated value having a higher accuracy. Further, it is possible to reduce a usage amount of a memory in an estimation circuit.

Item 7

The signal processing apparatus according to Item 6, in which the time T2 is later than the time T1 by a prescribed time period Tc, and the time T4 is later than the time T3 by the prescribed time period Tc.

In accordance with the signal processing apparatus according to Item 7, a variation of the signal processing apparatus is provided.

Item 8

A signal processing apparatus according to Item 7, in which at each elapse of the prescribed time period Tc, in accordance with a value $V_{a\_Tk}$ (k is an integer of 1 or greater) of the output signal obtained at a certain time, the prediction circuit generates a plurality of predicted values $V_{b\_Tk+1}$ corresponding to a value of the output signal that would be obtained after the prescribed time period Tc from the certain time, and at each elapse of the prescribed time period Tc, in accordance with a value $V_{a\_Tm}$ (m is an integer of 1 or greater) of the output signal obtained at another time different from the certain time, generates a plurality of predicted values $V_{b\_Tm+1}$ corresponding to a value of the output signal that would be obtained after the prescribed time period Tc from the other time. The estimation circuit evaluates an error $V_{e\_Tk+1}$ between the plurality of predicted values $V_{b\_Tk+1}$ and the value $V_{a\_Tk+1}$ of the output signal and an error $V_{e\_Tm+1}$ between the plurality of predicted values $V_{b\_Tm+1}$ and the value $V_{a\_Tm+1}$ of the output signal so as to generate, on the basis of the error $V_{e\_Tk+1}$, the error $V_{e\_Tm+1}$, or an accumulated value of the errors, the estimated value Pe of the object to be measured.

In accordance with the signal processing apparatus according to Item 8, a variation of the signal processing apparatus is provided.

Item 9

A signal processing apparatus according to Item 7, in which at each elapse of the prescribed time period Tc, in accordance with a value $V_{a\_Tk}$ (k is an integer of 1 or greater) of the output signal obtained at the each time, the prediction circuit generates a plurality of predicted values $V_{b\_Tk+n}$ corresponding to a value of the output signal that would be obtained after the prescribed time period n*Tc (n is an integer of 1 or greater) from that time. The estimation circuit evaluates an error $V_{e\_Tk+n}$ between the plurality of predicted values $V_{b\_Tk}$+n and the value $V_{a\_Tk+n}$ of the output signal and an error $V_{e\_Tk+n+1}$ between the plurality of predicted values $V_{b\_Tk+n+1}$ and the value $V_{a\_Tk+n+1}$ of the output signal so as to generate on the basis of the error $V_{e\_Tk+n}$, the error $V_{e\_Tk+n+1}$, or an accumulated value of the errors, the estimated value Pe of the object to be measured.

In accordance with the signal processing apparatus according to Item 9, a variation of the signal processing apparatus is provided.

Item 10

The signal processing apparatus according to Item 8 or 9, in which the estimation circuit generates, on the basis of an accumulated value of the errors over a previously determined period, the estimated value Pe of the object to be measured.

In accordance with the signal processing apparatus according to Item 10, it is possible to generate an estimated value of a property of an object to be measured in accordance with linear interpolation, for example.

Item 11

The signal processing apparatus according to Item 8 or 9, in which the estimation circuit generates, on the basis of a minimum value of an absolute value of the accumulated value of the errors, the estimated value Pe of the object to be measured.

In accordance with the signal processing apparatus according to Item 11, it is possible to obtain, with a relatively simple configuration, an estimated value having a high accuracy.

Item 12

The signal processing apparatus according to any one of Items 8 to 11, in which the accumulated value of the errors is reset for each previously determined period.

In accordance with the signal processing apparatus according to Item 12, even when a property of the object to be measured is changed, it is possible to reduce the error of the estimated value.

Item 13

The signal processing apparatus according to any one of Items 1 to 4, in which in accordance with the value $V_{a\_T1}$ of the output signal obtained at the time T1, the prediction circuit further generates, on the basis of a relationship, different depending on each of a plurality of converged values $V_c$ corresponding to the respectively different parameter values, a plurality of predicted values $V_{b\_T5}$ corresponding to a value of the output signal that would be obtained at a time T5 different from the time T2. The estimation circuit evaluates an error $V_{e\_T2}$ between the plurality of predicted values $V_{b\_T2}$ and the value $V_{a\_T2}$ of the output signal obtained at the time T2, and an error $V_{e\_T5}$ between the plurality of predicted values $V_{b\_T5}$ and the value of the output signal $V_{a\_T5}$ of the output signal obtained at the time T5 so as to generate, on the basis of the error $V_{e\_T2}$, the error $V_{e\_T5}$, or an accumulated value of the errors, the estimated value Pe of the object to be measured.

In accordance with the signal processing apparatus according to Item 13, it is possible to improve an accuracy of the estimated value.

Item 14

The signal processing apparatus according to any one of Items 1 to 10, in which the prediction circuit updates a plurality of predicted values corresponding to the value of the output signal.

In accordance with the signal processing apparatus according to Item 14, it is possible to generate a correct estimated value even when a structure of a surrounding area of a response unit of a sensor is changed.

Item 15

The signal processing apparatus according to any one of Items 1 to 14, in which the prediction circuit includes a neural network.

In accordance with the signal processing apparatus according to Item 15, it is possible to reduce an amount of information for generating a predicted value.

Item 16

The signal processing apparatus according to any one of Items 1 to 15, further including the sensor.

Item 17

A signal processing method, including: receiving, from a sensor, an output signal $V_{a(T)}$; generating, in a transition response period before a response time period Tr elapses, where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at a time T1, on the basis of a relationship, different depending on each of a plurality of converged values $V_c$ corresponding to the respectively different values of the parameter, a plurality of predicted values $V_{b\_T2}$ corresponding to a value of the output signal that would be obtained at a time T2 after the time T1; and generating, on the basis of a value $V_{a\_T2}$ of the output signal obtained at the time T2 and the plurality of predicted values $V_{b\_T2}$, an estimated value Pe of the parameter representing the certain property of the object to be measured.

In accordance with the signal processing method according to Item 17, it is possible to evaluate relatively easily and sufficiently accurately an estimated value on the basis of an output signal from a sensor.

Item 18

A program causing a computer to execute: receiving, from a sensor, an output signal $V_{a(T)}$; generating, in a transition response period before a response time period Tr elapses, where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at a time T1, on the basis of a relationship, different depending on each of a plurality of converged values $V_c$ corresponding to the respectively different values of the parameter, a plurality of predicted values $V_{b\_T2}$ corresponding to a value of the output signal that would be obtained at a time T2 after the time T1; and generating, on the basis of a value $V_{a\_T2}$ of the output signal obtained at the time T2 and the plurality of predicted values $V_{b\_T2}$, an estimated value Pe of the parameter representing the certain property of the object to be measured.

In accordance with the program according to Item 18, it is possible to evaluate, by using a computer, relatively easily and sufficiently accurately an estimated value on the basis of an output signal from a sensor.

INDUSTRIAL APPLICABILITY

The present invention may be used for a signal processing apparatus, a signal processing method, and a computer program with which it is possible to evaluate, on the basis of an output signal from a sensor, an estimated value.

REFERENCE SIGNS LIST

10 Input interface
20 Prediction circuit
30 Estimation circuit
40 First memory
50 Second memory
80 Sensor
82 Sensor chip (response unit of sensor)
84 Package
86 Package
100A, 100B Signal processing apparatus

The invention claimed is:

1. A signal processing apparatus comprising:
   an input interface configured to receive an output signal $V_{a(T)}$ from a sensor;
   a prediction circuit configured to generate, on the basis of a relationship, different depending on each of a plurality of converged values $V_c$ corresponding to the respectively different values of a parameter, a plurality of predicted values $V_{b\_T2}$ corresponding to a value of the output signal that would be obtained at a time T2 after a time T1, in a transition response period before a response time period Tr elapses, where Tr denotes a response time period required for a value of the output signal $V_{a(T)}$ to become a converged value $V_c$ corresponding to a value P of the parameter representing a certain property of an object to be measured, in accordance with a value $V_{a\_T1}$ of the output signal obtained at the time T1; and
   an estimation circuit configured to generate, on the basis of a value $V_{a\_T2}$ of the output signal obtained at the time T2 and the plurality of predicted values $V_{b\_T2}$, an estimated value Pe of a parameter representing the certain property of the object to be measured.

2. The signal processing apparatus according to claim 1, further comprising:
   a first memory configured to store the value of the output signal $V_{a(T)}$, wherein
   the prediction circuit acquires from the first memory the value $V_{a\_T1}$ of the output signal obtained at the time T1 to generate the plurality of predicted values $V_{b\_T2}$, and
   the estimation circuit acquires from the prediction circuit the plurality of predicted values $V_{b\_T2}$.

3. The signal processing apparatus according to claim 1, further comprising a second memory configured to store the plurality of predicted values $V_{b\_T2}$ and the respectively different values P of the parameter in an associated manner, wherein
   the estimation circuit acquires the plurality of predicted values $V_{b\_T2}$ and the respectively different values P of the parameter from the second memory.

4. The signal processing apparatus according to claim 1, wherein the estimation circuit evaluates an error $V_{e\_T2}$ between the plurality of predicted values $V_{b\_T2}$ and the value $V_{a\_T2}$ of the output signal obtained at the time T2 to generate, on the basis of the error $V_{e\_T2}$, the estimated value Pe of the object to be measured.

5. The signal processing apparatus according to claim 1, wherein in accordance with a value $V_{a\_T3}$ of the output signal obtained at a time T3 after the time T1, the prediction circuit further generates, on the basis of a relationship, different depending on each of a plurality of converged values $V_c$ corresponding to the respectively different values of the parameter, a plurality of predicted values $V_{b\_T4}$ corresponding to a value of the output signal that would be obtained at a time T4 after the time T3.

6. The signal processing apparatus according to claim 1, wherein
   in accordance with a value $V_{a\_T3}$ of the output signal obtained at a time T3 after the time T1, the prediction circuit further generates, on the basis of a relationship, different depending on each of a plurality of converged values $V_c$ corresponding to the respectively different values of the parameter, a plurality of predicted values $V_{b\_T4}$ corresponding to a value of the output signal that would be obtained at a time T4 after the time T3, and
   the estimation circuit evaluates an error $V_{e\_T2}$ between the plurality of predicted values $V_{b\_T2}$ and the value $V_{a\_T2}$ of the output signal obtained at the time T2, and an error $V_{e\_T4}$ between the plurality of predicted values $V_{b\_T4}$ and the value $V_{a\_T4}$ of the output signal obtained at the time T4 so as to generate, on the basis of the error $V_{e\_T2}$, the error $V_{e\_T4}$, or an accumulated value of the errors, the estimated value Pe of the object to be measured.

7. The signal processing apparatus according to claim 6, wherein
   the time T2 is later than the time T1 by a prescribed time period Tc, and
   the time T4 is later than the time T3 by the prescribed time period Tc.

8. The signal processing apparatus according to claim 7, wherein at each elapse of the prescribed time period Tc, in accordance with a value $V_{a\_Tk}$ (k is an integer of 1 or greater) of the output signal obtained at a certain time, the prediction circuit generates a plurality of predicted values $V_{b\_Tk+1}$ corresponding to a value of the output signal that would be obtained after the prescribed time period Tc from the certain time, and at each elapse of the prescribed time period Tc, in accordance with a value $V_{a\_Tm}$ (m is an integer of 1 or greater) of the output signal obtained at another time different from the certain time, generates a plurality of predicted values $V_{b\_Tm+1}$ corresponding to a value of the output signal that would be obtained after the prescribed time period Tc from the other time, and the estimation circuit evaluates an error $V_{e\_Tk+1}$ between the plurality of predicted values $V_{b\_Tk+1}$ and the value $V_{a\_Tk+1}$ of the output signal and an error $V_{e\_Tm+1}$ between the plurality of predicted values $V_{b\_Tm+1}$ and the value $V_{a\_Tm+1}$ of the output signal so as to generate, on the basis of the error $V_{e\_Tk+1}$, the error $V_{e\_Tm+1}$, or an accumulated value of the errors, the estimated value Pe of the object to be measured.

9. The signal processing apparatus according to claim 8, wherein the estimation circuit generates, on the basis of an accumulated value of the errors over a previously determined period, the estimated value Pe of the object to be measured.

10. The signal processing apparatus according to claim 1, wherein in accordance with the value $V_{a\_T1}$ of the output signal obtained at the time T1, the prediction circuit further generates, on the basis of a relationship, different depending on each of a plurality of converged values $V_c$ corresponding to the respectively different values of the parameter, a plurality of predicted values $V_{b\_T5}$ corresponding to a value of the output signal that would be obtained at a time T5 different from the time T2, and the estimation circuit evaluates an error $V_{e\_T2}$ between the plurality of predicted values $V_{b\_T2}$ and the value $V_{a\_T2}$ of the output signal obtained at the time T2, and an error $V_{e\_T5}$ between the plurality of predicted values $V_{b\_T5}$ and the value $V_{a\_T5}$ of the output signal obtained at the time T5 so as to generate, on the basis of the error $V_{e\_T2}$, the error $V_{e\_T5}$, or an accumulated value of the errors, the estimated value Pe of the object to be measured.

11. The signal processing apparatus according to claim 1, wherein the prediction circuit updates a plurality of predicted values corresponding to the value of the output signal.

12. The signal processing apparatus according to claim 1, wherein the prediction circuit includes a neural network.

13. The signal processing apparatus according to claim 1, further comprising the sensor.

14. The signal processing apparatus according to claim 1, wherein the response time period varies according to a package structure of the sensor.

15. A signal processing method comprising:

receiving, from a sensor, an output signal $V_{a(T)}$;

generating, in a transition response period before a response time period Tr elapses, where Tr denotes a response time period required for a value of the output signal $V_{a(T)}$ to become a converged value $V_c$ corresponding to a value P of a parameter representing a certain property of an object to be measured, in accordance with a value $V_{a\_T1}$ of the output signal obtained at a time T1, on the basis of a relationship, different depending on each of a plurality of converged values $V_c$ corresponding to the respectively different values of the parameter, a plurality of predicted values $V_{b\_T2}$ corresponding to a value of the output signal that would be obtained at a time T2 after the time T1; and generating, on the basis of a value $V_{a\_T2}$ of the output signal obtained at the time T2 and the plurality of predicted values $V_{b\_T2}$, an estimated value Pe of the parameter representing the certain property of the object to be measured.

* * * * *